(12) United States Patent
Nishida et al.

(10) Patent No.: US 8,167,756 B2
(45) Date of Patent: May 1, 2012

(54) LUBRICATING OIL SUPPLY DEVICE FOR AUTOMATIC TRANSMISSION

(75) Inventors: Masaaki Nishida, Anjo (JP); Hiroshi Katou, Kariya (JP); Masashi Kitou, Anjo (JP); Yuichi Seki, Anjo (JP); Yusuke Takahashi, Anjo (JP); Toru Souda, Okazaki (JP); Satoru Kasuya, Hazu (JP)

(73) Assignee: Aisin AW Co., Ltd., Anjo (JP)

( * ) Notice: Subject to any disclaimer, the term of this patent is extended or adjusted under 35 U.S.C. 154(b) by 967 days.

(21) Appl. No.: 12/216,499

(22) Filed: Jul. 7, 2008

(65) Prior Publication Data

US 2009/0029820 A1    Jan. 29, 2009

(30) Foreign Application Priority Data

Jul. 6, 2007    (JP) ................................. 2007-178742
Dec. 27, 2007    (JP) ................................. 2007-336202

(51) Int. Cl.
*F16H 57/04*    (2010.01)

(52) U.S. Cl. ........................................................ 475/159

(58) Field of Classification Search .................... 475/159
See application file for complete search history.

(56) References Cited

U.S. PATENT DOCUMENTS

2005/0209039 A1* 9/2005 Kempf ......................... 475/159

FOREIGN PATENT DOCUMENTS

| JP | U 62-049052 | 3/1987 |
|----|-------------|--------|
| JP | A 06-207650 | 7/1994 |
| JP | A 08-270767 | 10/1996 |
| JP | A 2004-028291 | 1/2004 |
| JP | A 2006-250253 | 9/2006 |

* cited by examiner

*Primary Examiner* — Edwin A Young
(74) *Attorney, Agent, or Firm* — Oliff & Berridge, PLC

(57) ABSTRACT

A lubricating oil supply device for an automatic transmission that includes a washer arranged inside the automatic transmission and regulating a movement of an input shaft in the automatic transmission in a shaft direction, wherein the washer includes: an oil reception section that receives lubricating oil scattered by a centrifugal force in a radial direction of the input shaft of the automatic transmission, and a guide path that guides the lubricating oil received by the oil reception section to a thrust surface at an end surface of the washer in the shaft direction.

19 Claims, 11 Drawing Sheets

F I G . 1
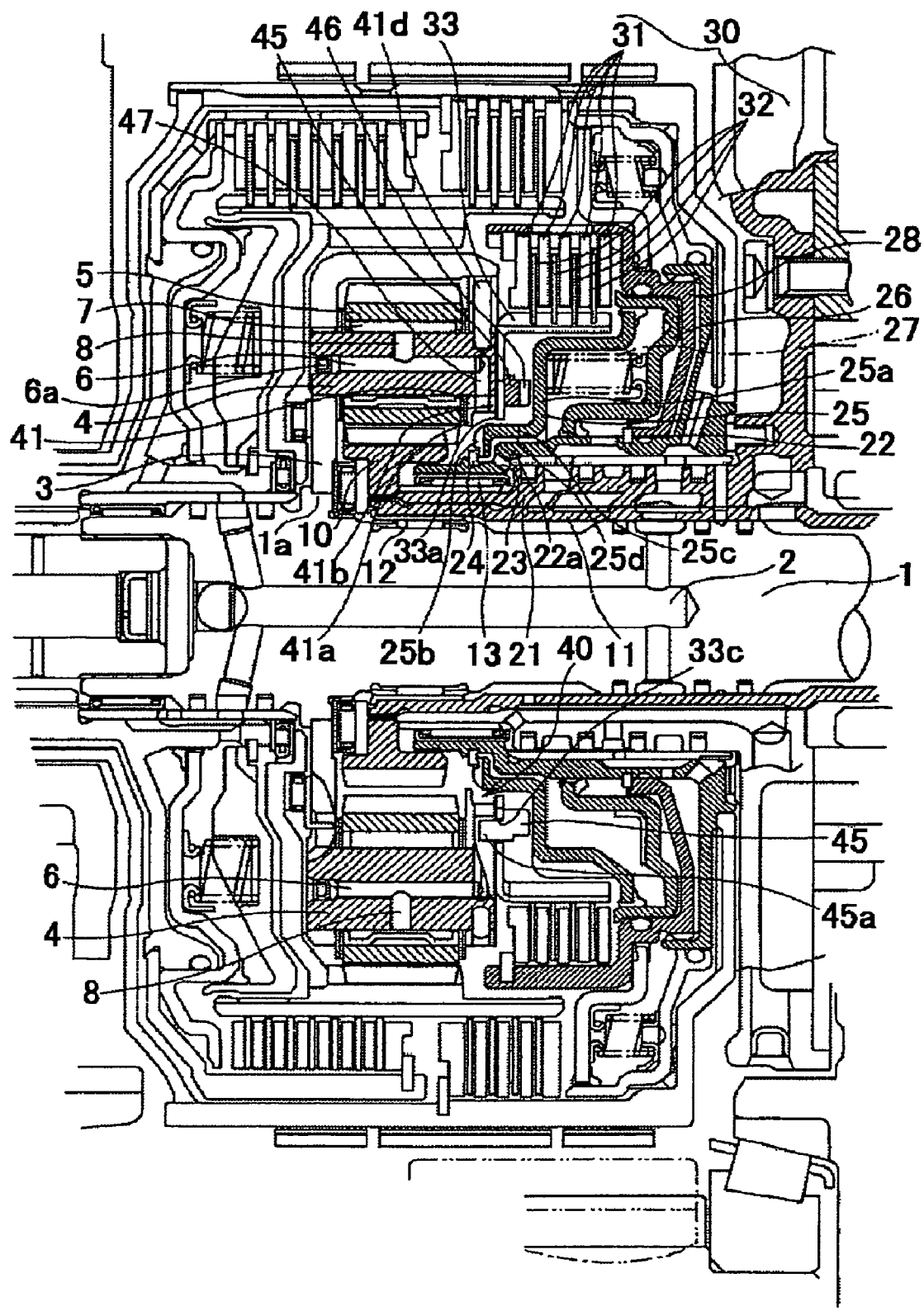

FIG. 10A
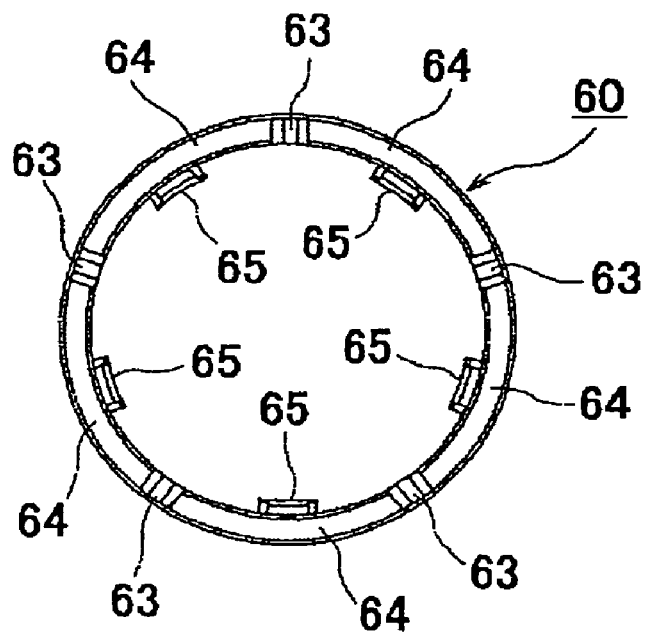
FIG. 10B
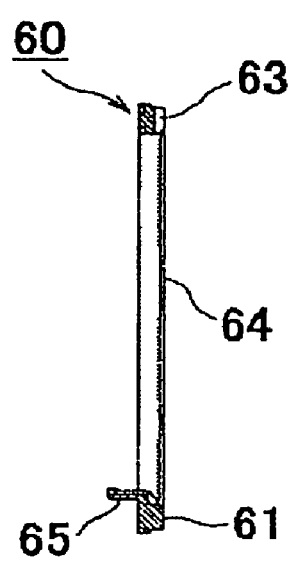
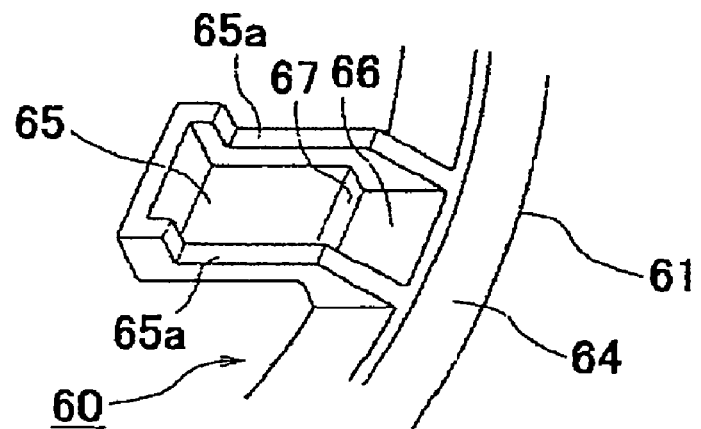
FIG. 10C

LUBRICATING OIL SUPPLY DEVICE FOR AUTOMATIC TRANSMISSION

INCORPORATION BY REFERENCE

The disclosure of Japanese Patent Application No. 2007-178742 filed on Jul. 6, 2007 and Japanese Patent Application No. 2007-336202 filed on Dec. 27, 2007 including the specification, drawings and abstract is incorporated herein by reference in its entirety.

BACKGROUND

The present invention relates to a lubricating oil supply device for an automatic transmission.

There exists a lubricating oil supply device for an automatic transmission as discussed by Japanese Patent Application Publication No. JP-A-2006-250253. In Japanese Patent Application Publication No. JP-A-2006-250253, a part of the lubricating oil is supplied from an oil hole (12a) (note that numbers within parentheses show components in the drawing of Japanese Patent Application Publication No. JP-A-2006-250253) formed in an input shaft (12) to an oil hole (22a) of a first sun gear (22) by a centrifugal force of a rotation of the input shaft (12), supplied to an inner side radial direction hole (50) formed in a support wall (44) by a rotation of the first sun gear (22), and then supplied from a radial direction hole (52) to a shaft direction hole (54) of a pinion shaft (32) and a pinion shaft (68). The lubricating oil introduced from the shaft direction hole (54) of the pinion shaft (32) and the pinion shaft (68) is guided to an outer circumference surface of the pinion shaft (32) and the pinion shaft (68). The lubricating oil is also supplied to a lubricating oil supply hole (86) from the space between the support wall (44) and a ring gear flange (88).

With this structure, the lubricating oil supplied to the lubricating oil supply hole (86) is supplied to an outer circumference side while expanding along an enlarged diameter section (86a), whereby the lubricating oil is supplied also to an inward friction plate (82) on a clutch piston (84) side and the inward friction plate (82) isolated from the clutch piston (84).

SUMMARY

However, with technology of Japanese Patent Application Publication No. JP-A-2006-250253, the lubricating oil supply hole (86) is structured by an enlarged diameter section (86a), which is open toward an outer circumference surface of a first sun gear (22) and a radial direction hole (52), which allows the enlarged diameter section (86a) to communicate with an inner circumference surface of the first sun gear (22) and has a smaller diameter than the enlarged diameter section (86a) to supply the lubricating oil in a wide range on an outer circumference side of the first sun gear (22). The lubricating oil supply hole (86) other than the enlarged diameter section (86a) has a smaller diameter compared therewith, whereby it is difficult to ensure a lubricating oil supply route which supplies the lubricating oil to a clutch in a case where the automatic transmission is made compact and a return spring and the like which pushes back a cancel oil chamber of the clutch or a piston of the clutch toward an inner diameter side of a clutch hub is arranged.

In order to solve the problems described above, it is an object of the present invention to provide a lubricating oil supply device for an automatic transmission which facilitates manufacturing of a smaller automatic transmission and can freely feed oil without resorting to drilling of a lubricating oil supply hole for a supply route of lubricating oil to other mechanism portions such as a clutch. The present invention can also achieve various other advantages.

A lubricating oil supply device for an automatic transmission includes a washer arranged inside the automatic transmission and regulating a movement of an input shaft in the automatic transmission in a shaft direction, wherein the washer includes: an oil reception section that receives lubricating oil scattered by a centrifugal force in a radial direction of the input shaft of the automatic transmission, and a guide path that guides the lubricating oil received by the oil reception section to a thrust surface at an end surface of the washer in the shaft direction.

A lubricating oil supply device for an automatic transmission that supplies lubricating oil to a clutch having a clutch plate and a clutch disk arranged inside the automatic transmission, according to an exemplary aspect of the invention includes a washer that has: an oil reception section that is formed, with respect to an approximately annular-shaped carrier cover that attaches both ends of a pinion shaft of a planetary gear arranged in a shaft direction of an input shaft of the automatic transmission, in a radial direction of the input shaft and receives the lubricating oil, and a guide path that guides the lubricating oil received by the oil reception section to a thrust surface at an end surface of the washer in the shaft direction, wherein: the washer regulates a movement in the shaft direction of the input shaft in the automatic transmission; and the lubricating oil, supplied from a lubricating oil hole of a clutch drum arranged in a circumference of the input shaft, is directly supplied from a lubricating oil groove of a cancel plate to the oil reception section without an intervention along a path.

A lubricating oil supply device for an automatic transmission that supplies lubricating oil to a clutch having a clutch plate and a clutch disk arranged inside the automatic transmission, according to an exemplary aspect of the invention, includes a carrier and a carrier cover that attach both ends of a pinion shaft of the planetary gear arranged in a shaft direction of an input shaft of the automatic transmission; an oil reception section structured by a wall section formed in the carrier cover in a radial direction of the input shaft, a base section of the carrier cover extending in a shaft direction of the pinion shaft, and an end section of an inner circumference surface of a clutch hub connected with the base section, the oil reception section being open in the shaft direction of the input shaft and in a circumferential direction; and a cutout which is formed on the inner circumference surface of the clutch hub and supplies the lubricating oil of the oil reception section in a clutch direction.

BRIEF DESCRIPTION OF THE DRAWINGS

Various exemplary aspects of the invention will be described with reference to the drawings, wherein:

FIG. 1 is a main section sectional view showing a lubricating oil supply device for an automatic transmission according to a first embodiment of the present invention;

FIGS. 10A, 10B, and 10C respectively show a front view, a longitudinal-sectional view, and a main section enlarged perspective view of a washer used in the lubricating oil supply device for an automatic transmission according to the fifth embodiment of the present invention.

DETAILED DESCRIPTION OF EMBODIMENTS

Figure 2:
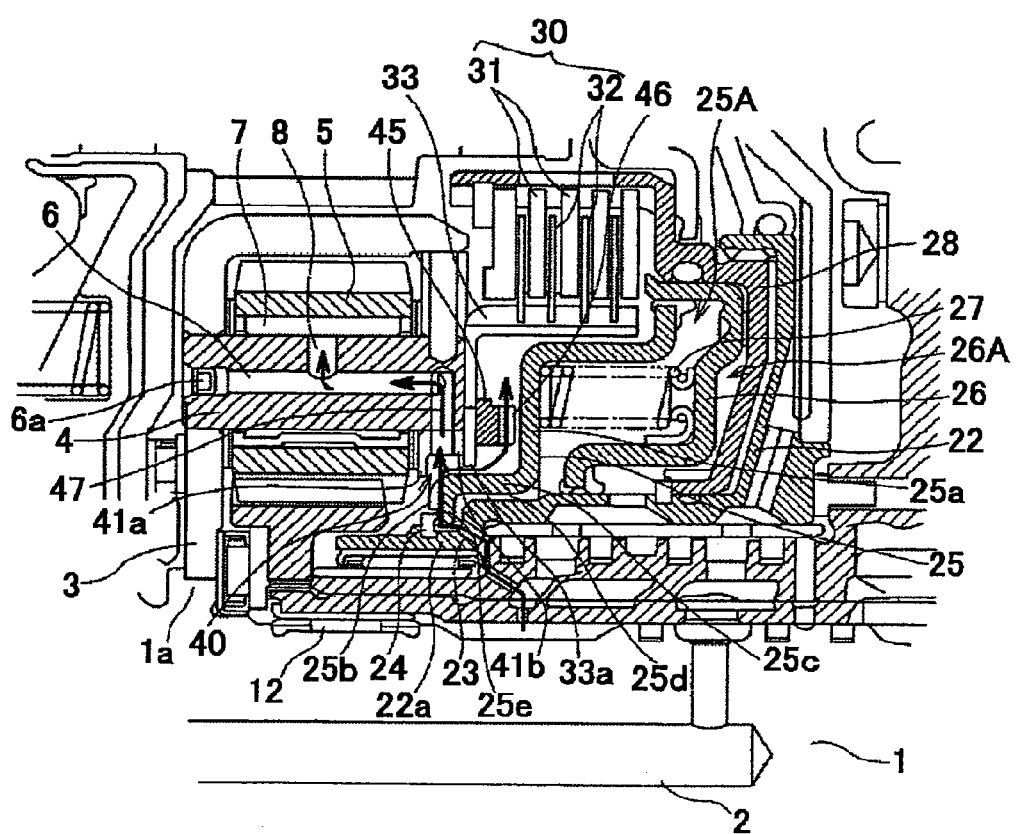
FIG. 2 is an illustrative view showing a flow of lubricating oil in a main section sectional surface showing the lubricating oil supply device for an automatic transmission according to the first embodiment of the present invention.

Embodiments of the present invention are described below based on the drawings. Note that, since same symbols and same reference numerals as those of a first embodiment in the drawings denote the same or corresponding functional portions in the embodiments, overlapping descriptions are omitted.

First Embodiment

Figure 3:
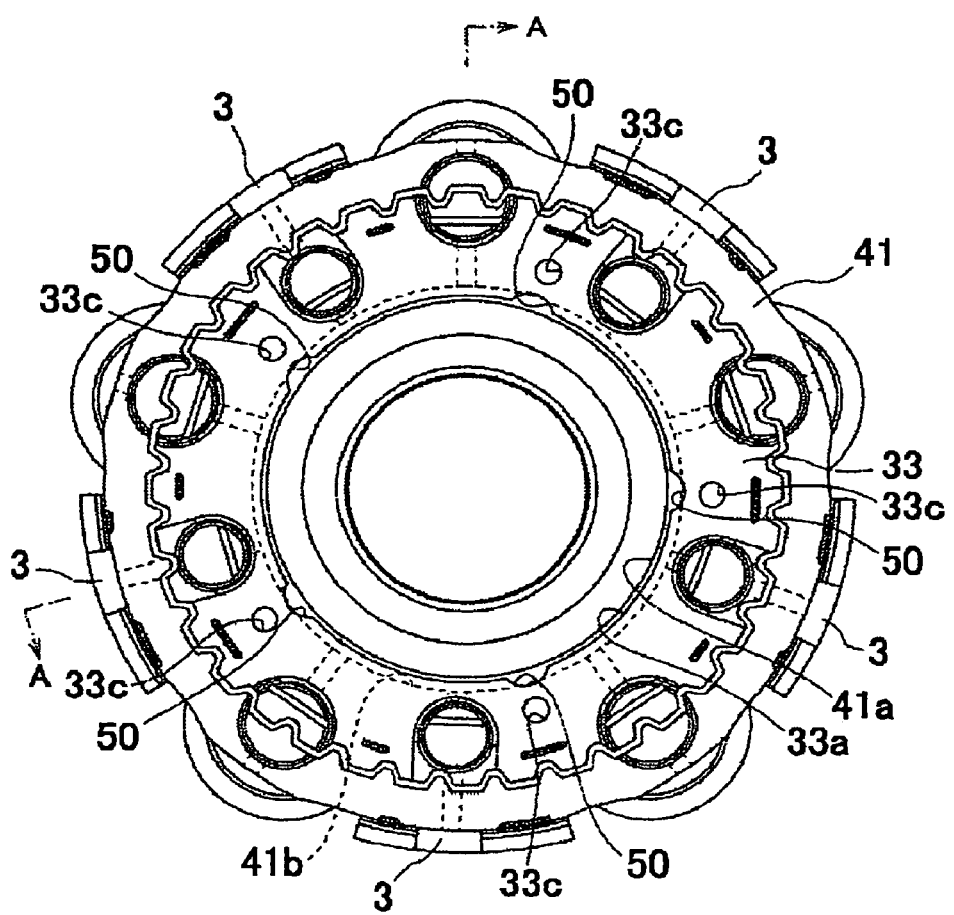
FIG. 3 is a side view of a main section showing the lubricating oil supply device for an automatic transmission according to the first embodiment of the present invention.
Figure 4:
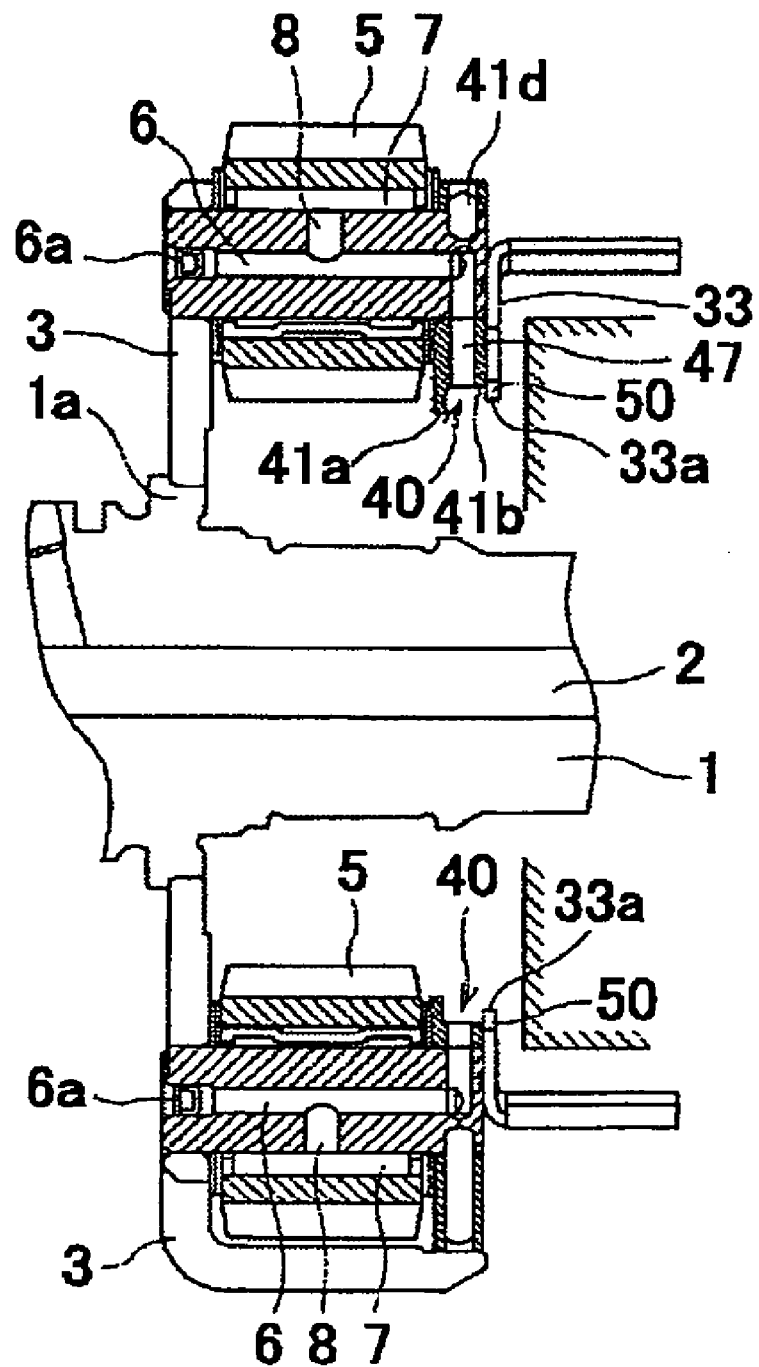
FIG. 4 is a sectional view of the main section of the lubricating oil supply device for an automatic transmission according to the first embodiment of the present invention, and corresponds to a sectional surface along a section line A-A of FIG. 3.
Figures 5A, 5B, 5C:
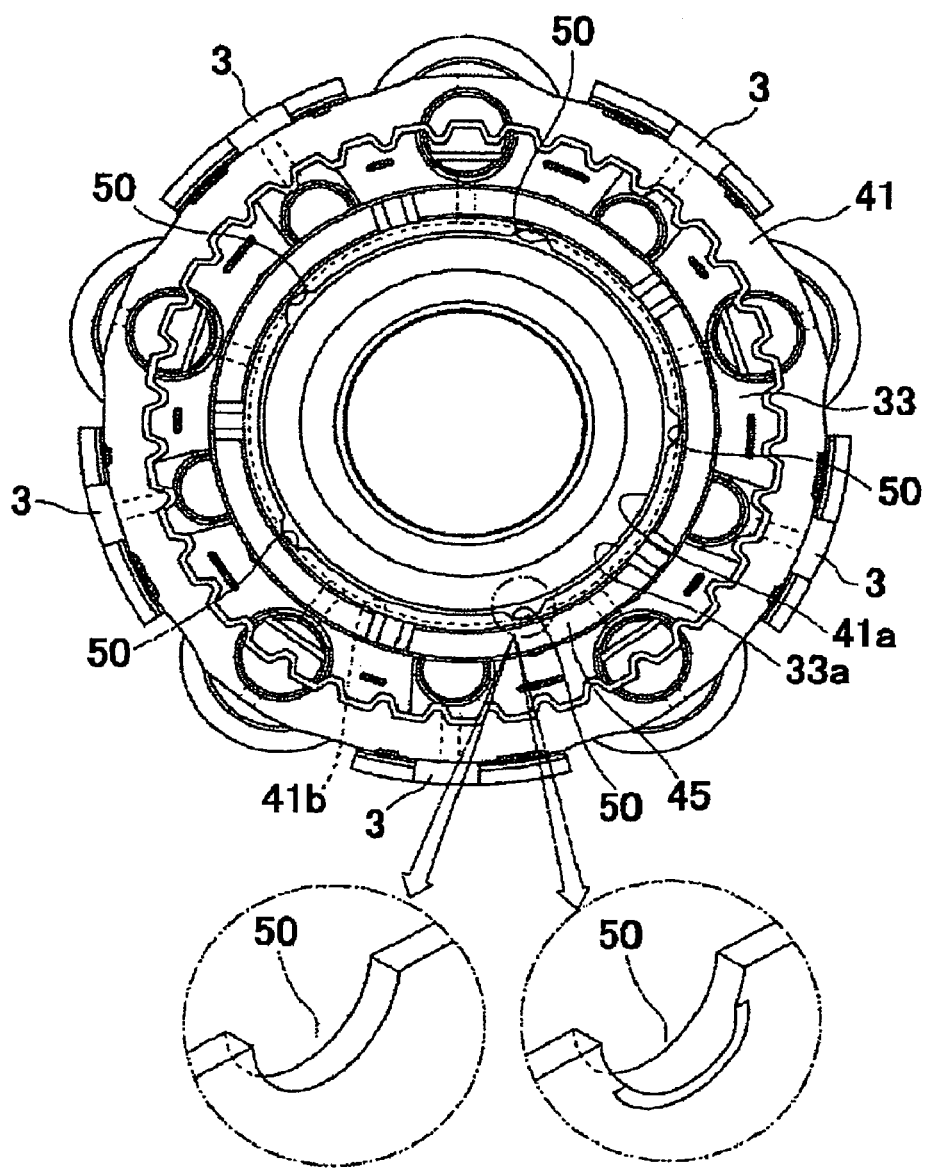
FIG. 5A is a side view of the main section with a resin washer showing the lubricating oil supply device for an automatic transmission according to the first embodiment of the present invention and FIGS. 5B and 5C illustrate an enlarged view of the cutout.

FIG. 1 is a main section sectional view showing a lubricating oil supply device for an automatic transmission according to a first embodiment of the present invention, and FIG. 2 is an illustrative view showing a flow of lubricating oil in a main section sectional surface of the lubricating oil supply device for an automatic transmission according to the first embodiment of the present invention. FIG. 3 is a side view of a main section showing the lubricating oil supply device for an automatic transmission according to the first embodiment of the present invention, and FIG. 4 is a sectional view of the main section showing the lubricating oil supply device for an automatic transmission according to the first embodiment of the present invention and corresponds to a sectional surface along a section line A-A of FIG. 3. FIG. 5A is a side view of the main section with a resin washer showing the lubricating oil supply device for an automatic transmission according to the first embodiment of the present invention and FIGS. 5B and 5C illustrate an enlarged view of the cutout.

In the drawings, an input shaft 1 is a shaft to which a rotation from a torque converter is input with an engine as a drive source, and a lubricating oil hole 2, which supplies required lubricating oil supplied from a pump to various mechanism parts, is drilled in a shaft direction, i.e., a shaft length direction thereof.

An approximately closed-bottom cylinder-shaped carrier 3 is attached so as to rotate integrally with a flange 1a of the input shaft 1. A pinion shaft 4 of a plurality of planetary gears is attached to a support wall section (hereinafter, a portion extending in a radial direction of the input shaft 1, i.e., a radial direction of the input shaft 1 is explained with a concept of a "wall" as a "wall section" or the "support wall section") corresponding to a bottom of the approximately closed-bottom cylinder-shaped carrier 3, and a plurality of pinions 5 are rotatably attached to the planetary gears with a needle bearing 7 therebetween. A lubricating oil hole 6 is drilled along an axis of the pinion shaft 4, and a lubricating oil hole 8 is further drilled in a circumferential direction (radial direction) from the lubricating oil hole 6, so that the lubricating oil is supplied to the needle bearing 7 arranged between the pinion shaft 4 and the pinions 5 of the planetary gears.

While the approximately closed-bottom cylinder-shaped carrier 3 secures one end of the pinion shaft 4, the other end of the pinion shaft 4 is adhered to an approximately annular-shaped carrier cover 41 formed of a separate member. The approximately annular-shaped carrier cover 41 is mounted on an opening side of the approximately closed-bottom cylinder-shaped carrier 3 to be integrated, whereby the pinion shaft 4 is tightly secured.

An inner side of the approximately annular-shaped carrier cover 41, i.e., an inner side of an approximate annular shape from the input shaft 1, is a wall section 41a extended to reduce a radial distance from the center of the input shaft 1. A base section 41b extending continuously with the wall section 41a in a shaft direction of the pinion shaft 4 is formed. Thus, a contour of an inner circumference sectional surface of the carrier cover 41 is an approximate L-shape.

Note that a metal washer is arranged at both ends of the pinion 5 in a circumference of the pinion shaft 4 for a relative rotation of the pinion 5 with the carrier 3 and the carrier cover 41.

Further, an oil reception section 40 is formed in the carrier cover 41 by an end section 33a, which is a part in an inner side direction of a clutch hub 33 connected with the base section 41b of the carrier cover 41, as an oil reservoir groove in the circumferential direction which is open in the shaft direction of the input shaft 1 receiving the lubricating oil.

The end section 33a in the inner direction of the clutch hub 33 is such that a height of the wall section 41a is set higher than a height of the end section 33a of the clutch hub 33, when seen from the oil reception section 40 with the base section 41b of the carrier cover 41 as a reference. That is, it is structured such that the lubricating oil passes over the height of the end section 33a of the clutch hub 33 to be supplied, when the oil reception section 40 is filled with the lubricating oil. In other words, the end section 33a in the inner direction of the clutch hub 33 is such that the diameter of an inner end of the wall section 41a is set smaller than the diameter of the end section 33a of the clutch hub 33, when seen in terms of a radius from the center of the input shaft 1.

In this embodiment, an approximately semicircle-shaped cutout 50 is provided on an inner circumference side of the clutch hub 33, whereby it is structured such that the lubricating oil is supplied from the cutout 50 of the clutch hub 33 to a clutch 30 side before the lubricating oil is filled in the oil reception section 40 and the lubricating oil passes over the height of an inner circumference of the end section 33a of the clutch hub 33 to be supplied to the clutch 30 side. That is, the cutout 50 of the clutch hub 33 is such that the height of the wall section 41*a* is set higher than a height of the cutout 50 of the clutch hub 33 from the base section 41*b* of the carrier cover 41, when seen from the oil reception section 40 with the base section 41*b* of the carrier cover 41 as the reference. That is, when the lubricating oil rises from the base section 41*b* of the carrier cover 41 to the oil reception section 40, the lubricating oil is supplied from the cutout 50 of the clutch hub 33 to the clutch 30. In other words, the cutout 50 of the clutch hub 33 is such that the diameter of the inner end of the wall section 41*a* is set smaller than the diameter of the cutout 50 of the clutch hub 33 on a side of the base section 41*b* of the carrier cover 41, when seen in terms of the diameter of the input shaft 1.

The pinion 5 is engaged with a sun gear 10. The sun gear 10 is connected with a stator shaft 11 secured to a case of an automatic transmission and is attached unrotatably. The stator shaft 11 and the input shaft 1 are rotatably attached with a needle bearing 12 therebetween. A sleeve member 21 is mounted to a boss section of the sun gear 10, which is mounted to the input shaft 1. The sleeve member 21 extends from an oil pump body, and is arranged with a boss section 22*a* of a clutch drum 22 with a needle bearing 13 therebetween. The boss section 22*a* of the clutch drum 22 is provided with a lubricating oil hole 23, whereby the lubricating oil supplied by an oil pump to the lubricating oil hole 2 of the input shaft 1 is supplied from the lubricating oil hole 23 of the boss section 22*a* of the clutch drum 22 to a drain groove 25*b* of an end section of a cancel plate 25, of which movement is restricted by a snap ring 24, via the sleeve member 21.

A piston member 26 is slidable in a circumference of the clutch drum 22. A return spring 27 is arranged between the piston member 26 and the cancel plate 25. That is, an elastic force which increases a gap between the cancel plate 25 and the piston member 26 is given by the return spring 27.

A drum member 28 forms a servo oil chamber 26A between itself and the piston member 26, whereby a hydraulic pressure controlled by a control valve (not shown) is introduced to the servo oil chamber 26A to disconnect the clutch 30 formed of a clutch plate 31 and a clutch disk 32 by the piston member 26. The clutch 30 is structured such that an inner side position in the radial direction from the input shaft 1 is supported by the clutch hub 33, and an outer circumference side thereof is supported by the drum member 28.

Between the clutch hub 33 and the cancel plate 25 of the clutch 30, an annular-shaped washer 45 made of resin which regulates a movement of the clutch hub 33 in the shaft direction is arranged in a position in an outer radial direction in which a radial distance from the center of the input shaft 1 is larger than a position of the approximately semicircle-shaped cutout 50. A groove 46 extending in the radial direction is formed in the resin washer 45. The groove 46 extending in the radial direction allows the lubricating oil supplied from the cutout 50 to flow to a washer 45 side by a rotation of the clutch hub 33, and then to be supplied to the plurality of clutch plates 31 and the clutch disks 32 of the clutch 30 via the groove 46 extending in the radial direction of the washer 45, whereby the lubricating oil can be supplied sufficiently to the clutch 30 even if the automatic transmission is structured to be compact. The washer 45 has a convex section 45*a* inserted in a mounting hole 33*c* of the clutch hub 33, whereby the washer 45 prevents rotation and is engaged so as not to be detached easily to maintain a stable attached state.

The washer 45 may be an ordinary washer made of metal and the like. The washer 45 is inserted and secured in an attachment hole drilled in the clutch hub 33, and is structured so as not to be detached easily.

In the middle of the oil reception section 40, a lubricating oil hole 47 which is connected with the lubricating oil hole 6 is drilled in each of the plurality of pinion shafts 4. Thus, when the lubricating oil is gathered in the oil reception section 40, the oil is fed to the lubricating oil hole 6 of each of the plurality of pinion shafts 4 via the lubricating oil hole 47. The lubricating oil supplied to the lubricating oil hole 6 is gradually supplied to the needle bearing 7 via the lubricating oil hole 8. When the lubricating oil gathered in the oil reception section 40 reaches an outermost circumference position of the cutout 50, the lubricating oil is scattered by a centrifugal force to the clutch 30 side surpassing the cutout 50, whereby the oil can be fed to the clutch 30.

The cancel plate 25 has a cylinder-shaped section 25*c* fitted in the boss section 22*a* of the clutch drum 22 arranged concentrically with the input shaft 1 and a support section 25*e* of an end section thereof where movement is restricted by the snap ring 24, the cylinder-shaped section 25*c* being formed with a drain groove 25*d*, which discharges the lubricating oil of a cancel oil chamber 25A formed by the cancel plate 25 and the piston member 26, in the shaft direction of the input shaft 1, and the support section 25*e* being formed with a drain groove 25*b* in the radial direction of the input shaft 1. Thus, the lubricating oil leaking from the cancel oil chamber 25A formed by the cancel plate 25 and the piston member 26 can be used efficiently.

The lubricating oil scattered from the drain groove 25*b* of the end section of the cancel plate 25 is received by the oil reception section 40 which is open in the shaft direction of the input shaft 1. The oil reception section 40 is formed by the wall section 41*a* of the approximately annular-shaped carrier cover 41 which, together with the carrier 3, attaches the pinion shaft 4, the base section 41*b* of the carrier cover 41 extending in the shaft direction of the pinion shaft 4, and the end section 33*a* in an inner direction of the clutch hub 33 connected with the base section 41*b* of the carrier cover 41. When the lubricating oil is gathered in the oil reception section 40, the oil is fed to the lubricating oil hole 6 of the pinion shaft 4 via the lubricating oil hole 47, since the lubricating oil hole 47 which is connected with the lubricating oil hole 6 of the pinion shaft 4 is drilled in the base section 41*b* of the carrier cover 41. The lubricating oil supplied to the lubricating oil hole 6 can gradually be fed to the needle bearing 7 via the lubricating oil hole 8.

The lubricating oil supply device for an automatic transmission of this embodiment structured in this manner can operate as follows.

The lubricating oil supplied by the oil pump (not shown) is supplied to a lubricating oil path provided to the sleeve member 21 of the oil pump body, passes through the lubricating oil hole 23 of the boss section 22*a* of the clutch drum 22, passes through the end section of the cancel plate 25 or the drain groove 25*b* formed at the end section of the cancel plate 25, and is scattered in the radial direction of the input shaft of the automatic transmission by the centrifugal force from the end section or the drain groove 25*b* formed at the end section of the cancel plate 25.

The scattered lubricating oil is received by the oil reception section 40 which is open in the shaft direction of the input shaft 1. The oil reception section 40 is formed by the wall section 41*a* of the approximately annular-shaped carrier cover 41 which, together with the carrier 3, attaches the pinion shaft 4, the base section 41*b* of the carrier cover 41 extending in the shaft direction of the pinion shaft 4, and the end section 33*a* as a part in the inner direction of the clutch hub 33 connected with the base section 41*b* of the carrier cover 41. When the lubricating oil is gathered in the oil reception section 40, the oil is fed to the lubricating oil hole 6 of the pinion shaft 4 of the planetary gear via the lubricating oil hole 47, since the lubricating oil hole 47 which is connected with the lubricating oil hole 6 of the pinion shaft 4 is drilled in the base section 41b of the carrier cover 41. The lubricating oil supplied to the lubricating oil hole 6 is gradually supplied to the needle bearing 7 and the like of the planetary gear via the lubricating oil hole 8. When the lubricating oil gathered in the oil reception section 40 is stored up to a depth in the outermost circumference position of the cutout 50, the lubricating oil is scattered by the centrifugal force to the clutch 30 side surpassing the cutout 50, whereby the oil can be fed to the clutch 30.

At this time, the lubricating oil of the oil reception section 40 can be distributed to a pinion shaft 4 side and the clutch 30 side. Since the cutout 50 is provided to the inner circumference of the clutch hub 33, the lubricating oil of the oil reception section 40 flows to the clutch 30 side from the pinion shaft 4 side and the cutout 50, and the lubricating oil can be supplied to a side of the planetary gear of the pinion shaft 4 and the clutch 30 side by suitably setting of a shape and size of the lubricating oil hole 47, and the cutout 50.

In particular, the shape of the cutout 50 may be, for example, a triangle, a trapezoid, a semicircle, and the like with a larger length on a side of the input shaft 1 as the center. At this time, the lubricating oil passing over and coming out of the cutout 50 can be scattered to the clutch 30 with high efficiency as the lubricating oil under an influence of the centrifugal force.

Second, Third, and Fourth Embodiments

Figures 6A, 6B, 6C:
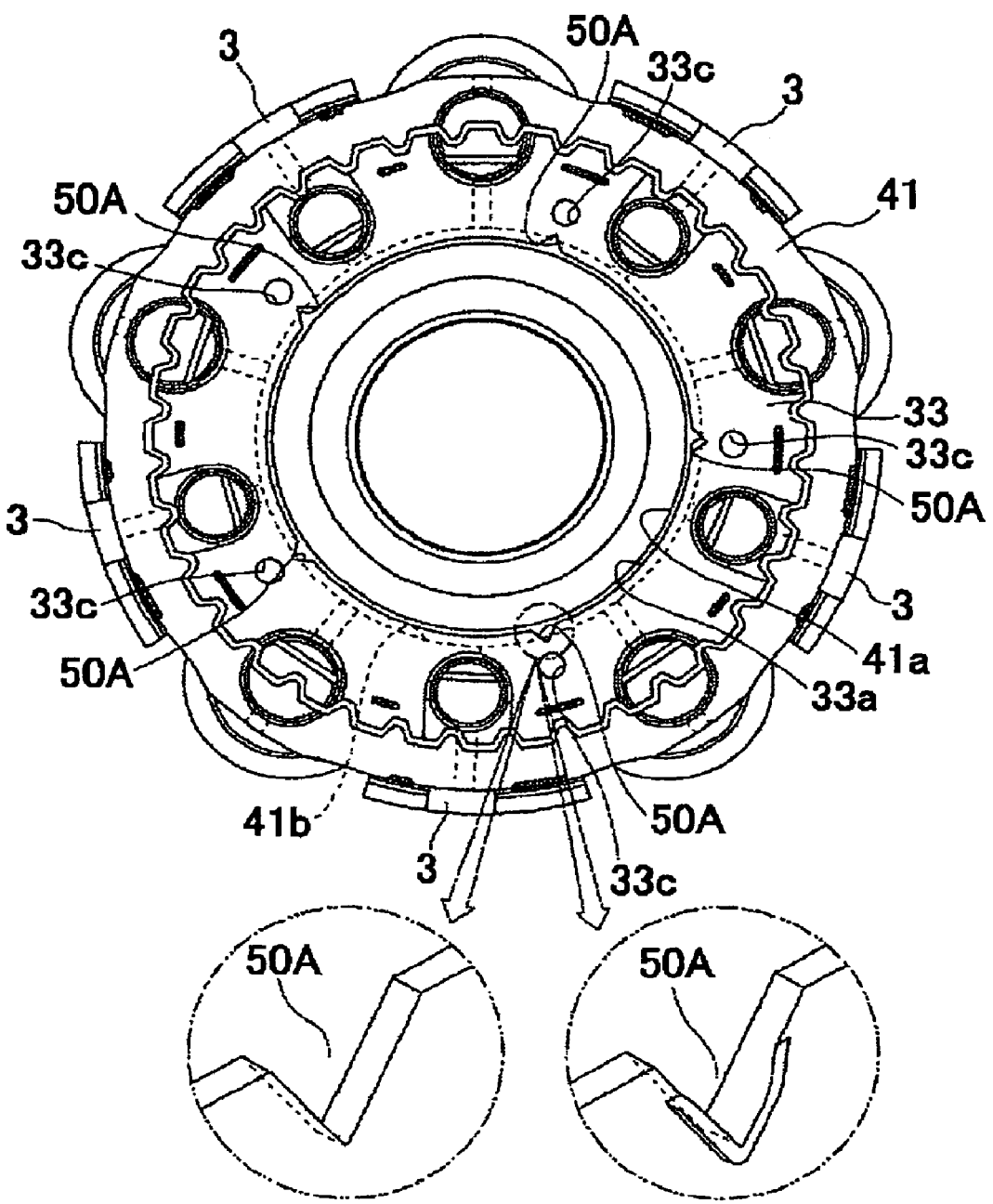
FIG. 6A is a sectional view of a main section showing a lubricating oil supply device for an automatic transmission according to a second embodiment of the present invention and FIGS. 6B and 6C illustrate an enlarged view of the cutout.
Figures 7A, 7B, 7C:
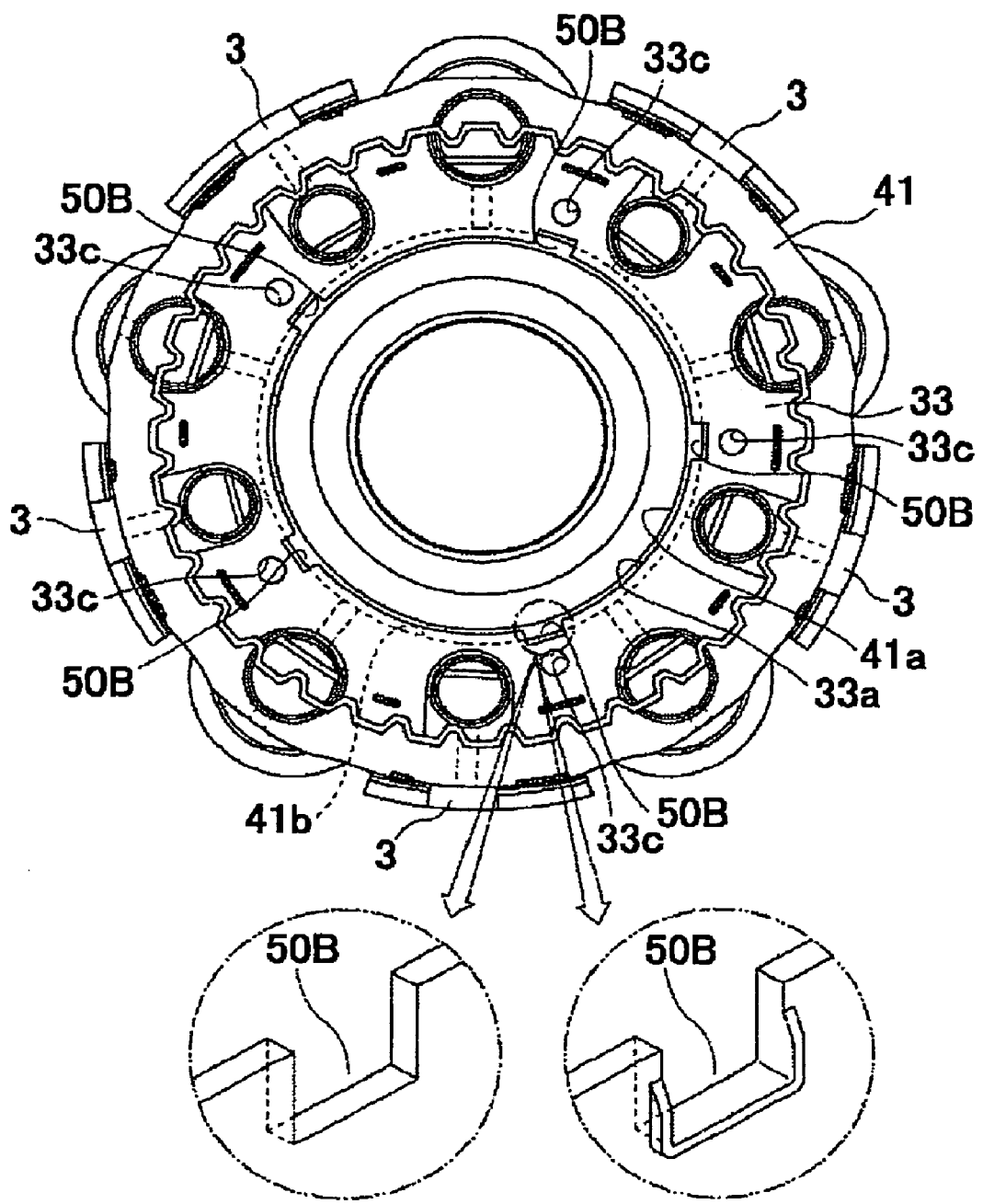
FIG. 7A is a sectional view of a main section showing a lubricating oil supply device for an automatic transmission according to a third embodiment of the present invention and FIGS. 7B and 7C illustrate an enlarged view of the cutout.
Figure 8A:
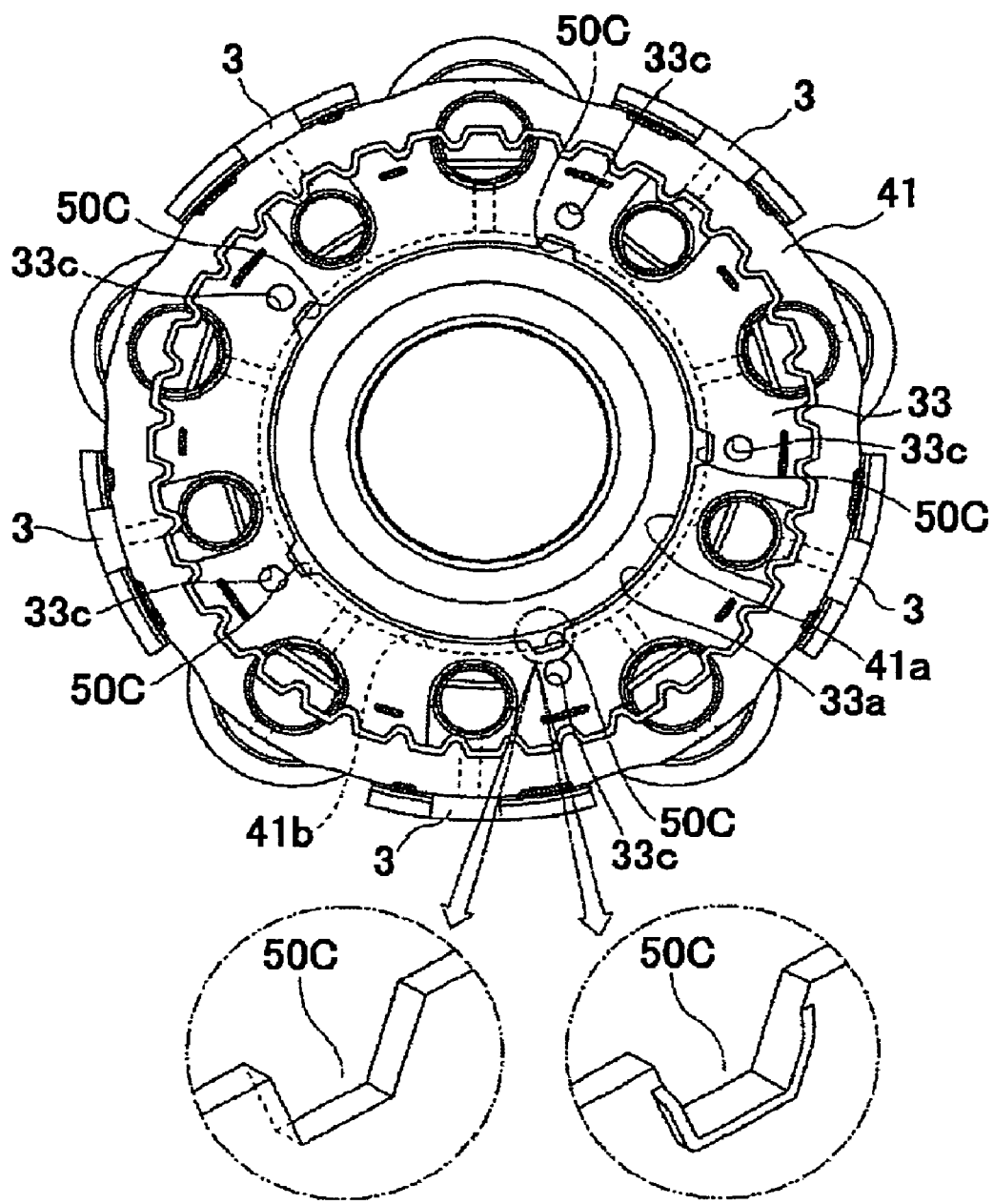
FIG. 8A is a sectional view of a main section showing a lubricating oil supply device for an automatic transmission according to a fourth embodiment of the present invention and FIGS. 8B and 8C illustrate an enlarged view of the cutout.

FIG. 6A is a sectional view of a main section showing a lubricating oil supply device for an automatic transmission according to a second embodiment of the present invention, FIG. 7A is a sectional view of a main section showing a lubricating oil supply device for an automatic transmission according to a third embodiment of the present invention, and FIG. 8A is a sectional view of a main section showing a lubricating oil supply device for an automatic transmission according to a fourth embodiment of the present invention.

In FIG. 6A, the lubricating oil supply device for an automatic transmission, which supplies the lubricating oil to the planetary gear formed of the pinion shaft 4, the pinion 5, and the like arranged inside the automatic transmission and the clutch 30 having the clutch plate 31 and the clutch disk 32, includes the carrier 3 and the approximately annular-shaped carrier cover 41, which attach both ends of the pinion shaft 4 of the planetary gear arranged in the same shaft direction as the shaft direction of the input shaft 1 of the automatic transmission, the oil reception section 40, which is structured by the wall section 41a formed in the carrier cover 41 in the radial direction from the input shaft 1, the base section 41b of the carrier cover 41 extending in the shaft direction of the pinion shaft 4, and the end section on the inner circumference surface of the clutch hub 33 connected with the base section 41b and which is open in the shaft direction of the input shaft 1 and the circumferential direction, and a cutout 50A, which supplies the lubricating oil of the oil reception section 40 formed on the inner circumference surface of the clutch hub 33 in the clutch direction and is cut out in an approximate triangle shape, and supplies the lubricating oil, supplied from the lubricating oil hole 23 of the clutch drum 22 arranged in a circumference of the input shaft 1, from the drain groove 25b of the cancel plate 25 to the oil reception section 40 without an intervention along the path.

In particular, as shown in FIG. 6B, the cutout 50A, which supplies the lubricating oil of the oil reception section 40 formed in the inner circumference surface of the clutch hub 33 in the clutch 30 direction and is cut out in the approximate triangle shape, is punched out in an approximate V-shape with respect to a plane of the clutch hub 33. When the lubricating oil is fed from the oil reception section 40 to the clutch 30 side, the cutout 50A punched out in the approximate V-shape with respect to the plane of the clutch hub 33 also allows the supply in the clutch 30 direction with an influence of a surface tension by causing an apex on a base section 41b side of the carrier cover 41 to protrude toward an opposite side of the base section 41b of the carrier cover 41 by a press process and the like as shown in FIG. 6C, according to a supply position adjustment or a supply oil amount thereof. The same can be said for the approximately semicircle-shaped cutout 50 on the inner circumference side of the clutch hub 33.

In FIG. 7A, the lubricating oil supply device for an automatic transmission includes the carrier 3 and the approximately annular-shaped carrier cover 41, which attach both ends of the pinion shaft 4 of the planetary gear arranged in the same shaft direction as the shaft direction of the input shaft 1 of the automatic transmission, the oil reception section 40, which is structured by the wall section 41a formed in the carrier cover 41 in the radial direction of the input shaft 1, the base section 41b of the carrier cover 41 extending in the shaft direction of the pinion shaft 4, and the end section on the inner circumference surface of the clutch hub 33 connected with the base section 41b and which is open in the shaft direction of the input shaft 1 and the circumferential direction, and a cutout 50B, which supplies the lubricating oil of the oil reception section 40 formed on the inner circumference surface of the clutch hub 33 in the clutch 30 direction and is cut out in an approximate quadrangle shape, and supplies the lubricating oil, supplied from the lubricating oil hole 23 of the clutch drum 22 arranged in the circumference of the input shaft 1, from the drain groove 25b of the cancel plate 25 to the oil reception section 40 without an intervention along the path.

In particular, as shown in FIG. 7B, the cutout 50B, which supplies the lubricating oil of the oil reception section 40 formed in the inner circumference surface of the clutch hub 33 in a clutch 30 direction and is cut out in the approximate quadrangle shape, is punched out in an approximate squared U-shape with respect to the plane of the clutch hub 33. When the lubricating oil is fed from the oil reception section 40 to the clutch 30 side, the cutout 50B punched out in the approximate squared U-shape with respect to the plane of the clutch hub 33 allows the lubricating oil to be supplied in the clutch 30 direction with the influence of the surface tension by causing a base of the carrier cover 41 on the base section 41b side to protrude toward the opposite side of the base section 41b of the carrier cover 41 by the press process and the like as shown in FIG. 7C, according to the supply position adjustment or the supply oil amount thereof.

In FIG. 8A, the lubricating oil supply device for an automatic transmission includes a cutout 50C, which supplies the lubricating oil of the oil reception section 40 formed in the inner circumference surface of the clutch hub 33 in the clutch 30 direction and is cut out in an approximate trapezoid shape, and supplies the lubricating oil, supplied from the lubricating oil hole 23 of the clutch drum 22 arranged in the circumference of the input shaft 1, from the drain groove 25b of the cancel plate 25 to the oil reception section 40 without an intervention along the path.

Figure 8B:
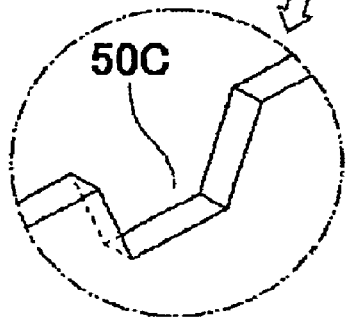
Figure 8C:
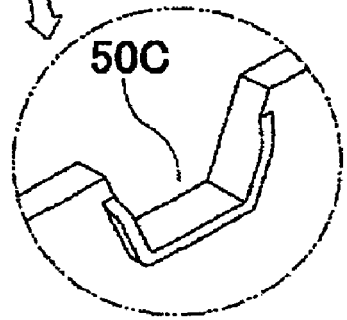

In particular, as shown in FIG. 8B, the cutout 50C, which supplies the lubricating oil of the oil reception section 40 formed in the inner circumference surface of the clutch hub 33 in the clutch 30 direction and is cut out in the approximate trapezoid shape, is punched out in the approximate trapezoid shape with respect to the plane of the clutch hub 33. When the lubricating oil is fed from the oil reception section 40 to the clutch 30 side, the cutout 50C punched out in the approximate trapezoid shape with respect to the plane of the clutch hub 33 allows the supply in the clutch 30 direction with the influence of the surface tension by causing a side on a short side of the carrier cover 41 on the base section 41b side to protrude toward the opposite side of the base section 41b of the carrier cover 41 by the press process and the like as shown in FIG. 8C, according to the supply position adjustment or the supply oil amount thereof.

In this manner, the lubricating oil can be supplied in the clutch 30 direction with the influence of the surface tension without flowing on the plane of the clutch hub 33 by the centrifugal force, by causing the cutout 50, 50A, 50B, or 50C on the side of the base section 41b of the carrier cover 41 to protrude toward the opposite side of the base section 41b of the carrier cover 41.

In this manner, in the lubricating oil supply device for an automatic transmission of the embodiments described above which supplies the lubricating oil to the clutch 30 arranged inside the automatic transmission, the oil reception section 40 in the circumferential direction which receives the lubricating oil and is open in the shaft direction of the input shaft 1 is formed in the carrier cover 41 by the wall section 41a of the approximately annular-shaped carrier cover 41 which, together with the carrier 3, attaches the pinion shaft 4, the base section 41b of the carrier cover 41 extending in the shaft direction of the pinion shaft 4, and the end section 33a as the part in the inner direction of the clutch hub 33 connected with the base section 41b of the carrier cover 41.

Thus, for example, when compared with the oil reception section 40 formed by both wall sections of the carrier cover 41 extending in the radial direction of the pinion shaft 4 and the base section 41b of the carrier cover 41 extending in the shaft direction therebetween, a width thereof can be made narrower in the shaft direction of the input shaft 1 whereby the automatic transmission as a whole can be made compact, since the oil reception section 40 is formed by the wall section 41a of the carrier cover 41 extending in the radial direction of the pinion shaft 4, the end section 33a of the clutch hub 33, and the base section 41b of the carrier cover 41 extending in the shaft direction therebetween.

The oil reception section 40 supplies the lubricating oil from a radial direction inner circumference side of the carrier cover 41, whereby the lubricating oil of the oil reception section 40 can be distributed to the pinion shaft 4 side and the clutch 30 side, and sufficient lubricating oil for the clutch 30 can be ensured even in the case where the automatic transmission is structured to be compact. By providing the cutout 50, 50A, 50B, or 50C on the inner circumference surface of the clutch hub 33, the lubricating oil of the oil reception section 40 flows to the pinion shaft 4 side and to the clutch side from the cutout 50, 50A, 50B, or 50C, whereby the lubricating oil can be distributed to the pinion shaft 4 side and the clutch 30 side by suitably setting the shape and size of the lubricating oil hole 47, the lubricating oil hole 4, and the cutout 50, 50A, 50B, or 50C.

While the clutch 30 in the case of carrying out the present invention is formed of the clutch plate 31 and the clutch disk 32 arranged inside the automatic transmission, the number of the clutch plates 31 and the clutch disks 32 is not limited in the case of carrying out the present invention.

The pinion shaft 4 may be a pinion shaft 4 of any planetary gear in the case of an automatic transmission of a plurality of speeds, and the planetary gear is not limited to the pinion 5 arranged in a specific position in the case of carrying out the present invention.

Regarding the wall section 41a of the carrier cover 41 extending in the radial direction of the pinion shaft 4 and the base section 41b of the carrier cover 41 extending in the shaft direction of the pinion shaft 4, it suffices that the sectional shape on the inner circumference side of the carrier cover 41 of which the base section 41b is flat be the approximate L-shape, and that the sectional shape on the inner circumference side of the carrier cover 41 of which the base section 41b is hollow and approximately U-shaped be an approximate J-shape.

Further, the oil reception section 40 in the circumferential direction which is open in the shaft direction of the input shaft 1 of the embodiments is specified as a groove in the circumferential direction which is open in the shaft direction of the input shaft 1, and it suffices that the depth of the oil reception section 40 be determined by the wall section 41a of the carrier cover 41 and the cutout 50, 50A, 50B, or 50C on a part of a surface of the clutch hub 33 and the width thereof be determined by the base section 41b of the carrier cover 41 extending in the shaft direction of the pinion shaft 4.

Moreover, since the lubricating oil supply device for an automatic transmission according to the embodiments is provided with the cutout 50, 50A, 50B, or 50C, which supplies the lubricating oil in the clutch 30 direction, on the inner circumference surface of the clutch hub 33, the lubricating oil flows to the pinion shaft 4 side and to the clutch 30 side from the cutout 50, whereby the lubricating oil can be distributed suitably to the pinion shaft 4 side and the clutch 30 side. A supply configuration of the lubricating oil can be specified by the shape of the cutout 50.

Since the cutout 50, 50A, 50B, or 50C formed on the inner circumference side of the clutch hub 33 of the lubricating oil supply device for an automatic transmission according to the embodiments has a shape which is made smaller as the diameter from the center of the input shaft 1 increases, the lubricating oil is caused to flow from the cutout 50, 50A, 50B, or 50C to the clutch 30 side while ensuring the lubricating oil on the pinion shaft 4 side, whereby the oil surface of the oil reception section 40 is stabilized and the lubricating oil can be supplied stably to the pinion shaft 4 side and the clutch 30 side.

In addition, since, in the lubricating oil supply device for an automatic transmission according to the embodiments, the washer 45, which regulates the movement of the clutch hub 33 in the shaft direction and forms the oil reception section 40 extending in the radial direction, is arranged between the clutch hub 33 and the cancel plate 25 of the clutch 30 in a position with a larger outer radial distance than a position of the cutout 50, 50A, 50B, or 50C from the center of the input shaft 1, the washer 45 being arranged in a radial direction more outer side than the cutout 50, 50A, 50B, or 50C, and further being formed with the groove 46 extending in the radial direction, the lubricating oil supplied from the cutout 50, 50A, 50B, or 50C flows to a washer 45 side and is supplied to the plurality of clutch plates 31 and the clutch disks 32 of the clutch 30 via the groove 46 extending in the radial direction of the washer 45 even if the centrifugal force of the clutch hub 33 is applied thereto, whereby the lubricating oil can be supplied sufficiently even if the automatic transmission is structured to be compact.

In the lubricating oil supply device for an automatic transmission according to the embodiments, the groove 46 provided to the washer 45 and extending in the radial direction is disposed with a phase in the circular circumferential direction dislocated with that of the cutout 50, 50A, 50B, or 50C of the clutch hub 33, and the groove 46 in the radial direction provided to the washer 45 is disposed with the phase dislocated with that of the cutout 50, 50A, 50B, or 50C even if the clutch hub 33 and the washer 45 are rotated and the lubricating oil supplied from the cutout 50, 50A, 50B, or 50C flows in a rotational direction, whereby the lubricating oil can be supplied to the clutch hub 33 without being influenced by the lubricating oil flowing in the rotational direction.

The washer 45 of the lubricating oil supply device for an automatic transmission according to the embodiments is sandwiched between the clutch hub 33 and the support wall section 25a of the cancel plate 25 of the clutch 30 such that the washer 45 is arranged on one side and the return spring 27 is arranged on the other side of the support wall section, whereby the automatic transmission can be structured to be compact without an influence on a mechanical strength while ensuring a supply of the lubricating oil to the plurality of clutch plates 31 and the clutch disks 32 of the clutch 30.

Further, in the lubricating oil supply device for an automatic transmission according to the embodiments which supplies the lubricating oil to the clutch 30 arranged inside the automatic transmission, the oil reception section 40 in the circumferential direction which receives the lubricating oil and is open in the shaft direction of the input shaft 1 is formed in the carrier cover 41 by the wall section 41a of the approximately annular-shaped carrier cover 41 which, together with the carrier 3, attaches the pinion shaft 4, the base section 41b of the carrier cover 41 extending in the shaft direction of the pinion shaft 4, and the end section 33a as the part in the inner direction of the clutch hub 33 connected with the base section 41b of the carrier cover 41, and the lubricating oil supplied from the lubricating oil hole 23 of the clutch hub 33 arranged in the circumference of the input shaft 1 is supplied from the support wall section of the cancel plate 25 to the oil reception section 40 without an intervention along the path, whereby the lubricating oil can be supplied to the clutch 30 without particularly forming a lubricating oil hole from the lubricating oil hole 23 of the support wall section of the clutch hub 33 to the oil reception section 40.

Fifth and Sixth Embodiments

Figure 9:
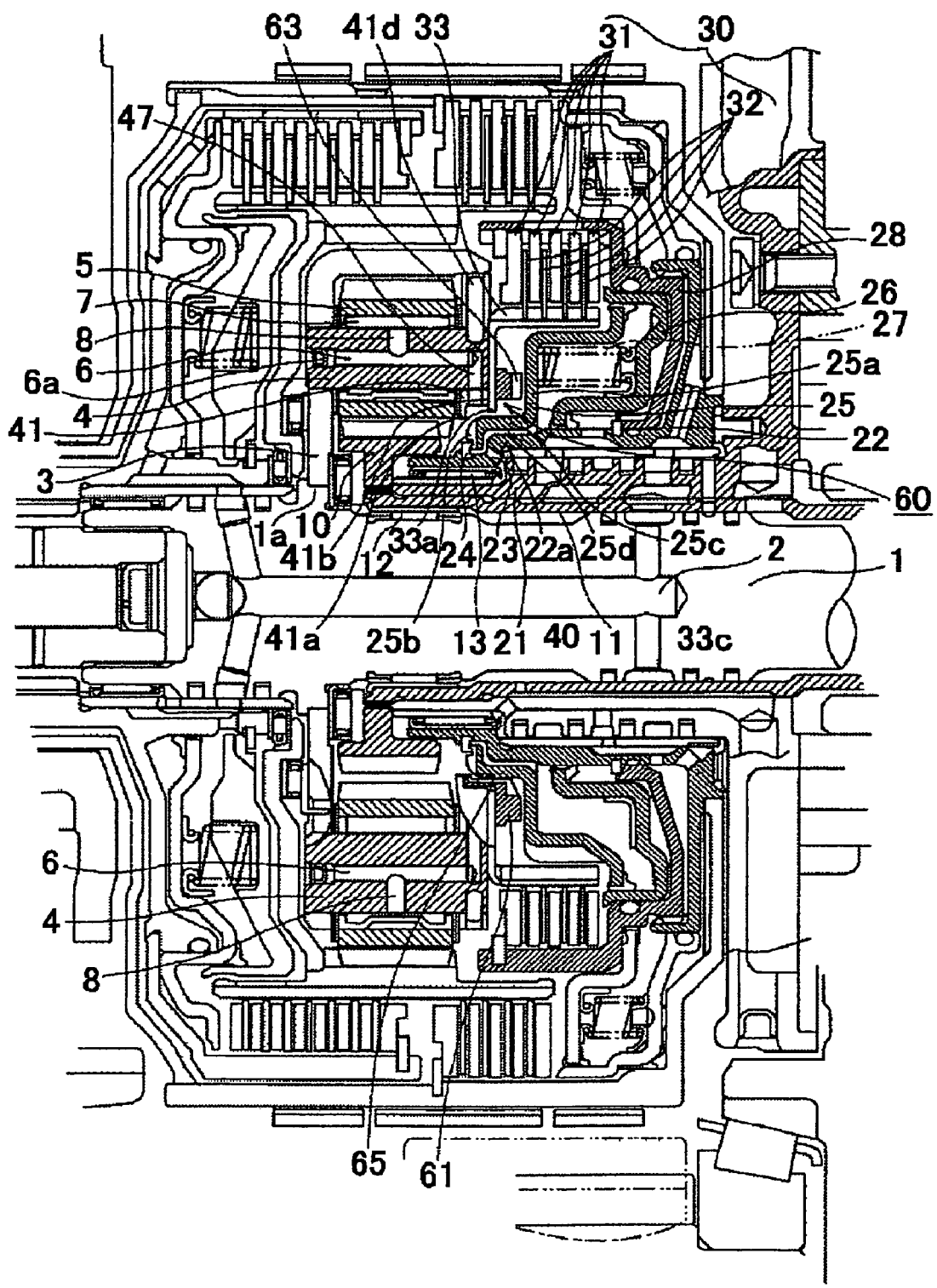
FIG. 9 is a main section sectional view showing a lubricating oil supply device for an automatic transmission according to a fifth embodiment of the present invention.
Figure 11A:
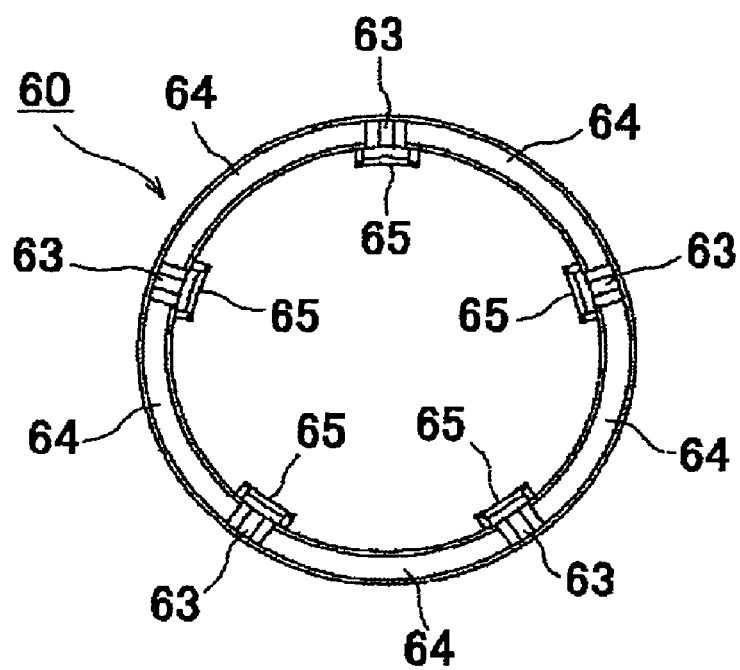
FIGS. 11A and 11B respectively show a front view and a main section enlarged perspective view of a washer used in a lubricating oil supply device for an automatic transmission according to a sixth embodiment of the present invention.
Figure 11B:
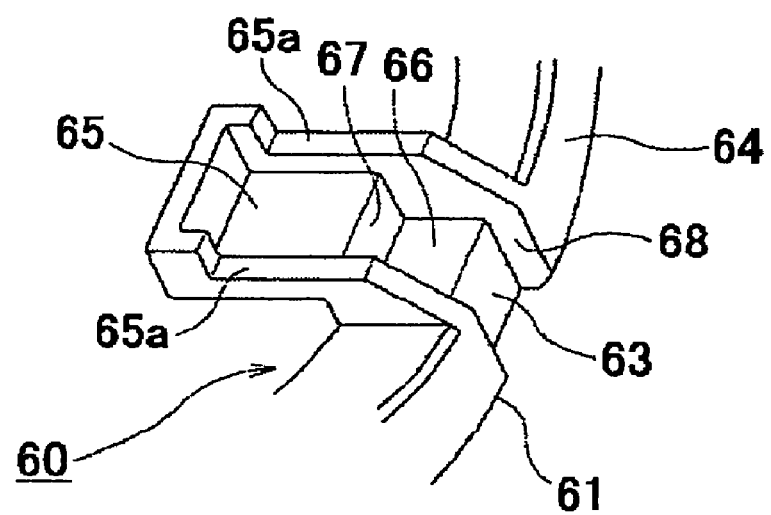

FIG. 9 is a main section sectional view showing a lubricating oil supply device for an automatic transmission according to a fifth embodiment of the present invention, FIGS. 10A, 10B, and 10C respectively show a front view, a middle longitudinal-sectional view, and a main section enlarged perspective view of a washer used in the lubricating oil supply device for an automatic transmission according to the fifth embodiment of the present invention, and FIGS. 11A and 11B respectively show a front view and a main section enlarged perspective view of a washer used in a lubricating oil supply device for an automatic transmission according to a sixth embodiment of the present invention.

In FIGS. 9-10C, an annular-shaped washer 60 according to the fifth embodiment is made of synthetic resin, and is engaged and attached to the inner circumference of the clutch hub 33 connected with the base section 41b of the carrier cover 41. The washer 60 is similar to the washer 45, which regulates the movement of the clutch hub 33 in the shaft direction, of the embodiments described above. Note that the annular-shaped washer 60 may also be made of metal.

The washer 60 is approximately annular-shaped as a whole, as shown in FIG. 10A, and includes an oil reception section 65 which receives the lubricating oil scattered by the centrifugal force in the radial direction of the input shaft 1 parallel to a longitudinal direction of the axis of the washer 60 and is open in the radial direction of the input shaft 1, in a plurality of parts, i.e., three or more parts in consideration of a balance as a whole and the supply of the lubricating oil, in an annular-shaped thrust section 61 thereof, and a guide path 66 which guides the lubricating oil received by the oil reception section 65 to a thrust surface 64 as an end surface of the washer 60 in the shaft direction. The washer 60 may be not only an annular shape but also an approximate annular shape such as a C-shape. Nevertheless, a stability of attachment of the washer 60 and the flow of the lubricating oil can be improved by employing the annular shape.

The oil reception section 65 has a capacity configuration with a depth which receives the lubricating oil, which is passed through the end section or the drain groove 25b formed at the end section of the cancel plate 25 and is scattered by the centrifugal force. In this embodiment, a storage capacity of the lubricating oil is formed by erecting an end section 65a.

In order to guide the lubricating oil received by the oil reception section 65 to the end surface of the washer 60 in the shaft direction, or specifically, the thrust surface 64, the guide path 66 is formed by the erected end section 65a. In this embodiment, a step 67 is formed at a boundary between the oil reception section 65 and the guide path 66, but a presence or absence of a step 67 is irrelevant in the case of carrying out the present invention. In particular, although the step 67 gives potential energy such that an intermittence of the lubricating oil does not occur, the step 67 may be formed as a slope or have a depth of the lubricating oil due to the surface tension.

The thrust section 61 guides the lubricating oil received by the oil reception section 65 through the guide path 66 such that the thrust surface 64 thereof does not directly make mechanical contact with a surface of the support wall section 25a of the cancel plate 25, causes the lubricating oil to flow on the surface thereof so that the thrust surface 64 and the surface of the support wall section 25a are in contact with the lubricating oil, and performs cooling of the whole washer 60 including the thrust section 61.

The lubricating oil supply device for an automatic transmission of this embodiment structured in this manner can operate as follows.

The lubricating oil supplied by the oil pump (not shown) is supplied to the lubricating oil path provided in the sleeve member 21 of the oil pump body, passes through the lubricating oil hole 23 of the boss section 22a of the clutch drum 22, passes through the end section of the cancel plate 25 or the drain groove 25b formed at the end section of the cancel plate 25, and is scattered in the radial direction of the input shaft 1 of the automatic transmission by the centrifugal force therefrom.

The scattered lubricating oil is received by the oil reception section 65 which is open in the shaft direction of the input shaft 1. The oil reception section 65 is formed in a configuration to receive the lubricating oil, which is passed through the end section of the cancel plate 25 or the drain groove 25b formed at the end section of the cancel plate 25 and is scattered by the centrifugal force. The lubricating oil gathered in the oil reception section 65 is guided to the thrust surface 64 on an end section surface of the thrust section 61 in the shaft direction of the input shaft 1 via the guide path 66. The lubricating oil received by the oil reception section 65 is guided through the guide path 66 such that the thrust surface 64 of the thrust section 61 does not directly make mechanical contact with the surface of the support wall section 25a of the cancel plate 25, the lubricating oil is caused to flow on the surface of the thrust surface 64 to make contact and perform the cooling of the whole washer 60 including the thrust section 61. Further, since the washer 60 is rotated, when the lubricating oil received by the oil reception section 65 is caused to flow on the surface thereof via the guide path 66, the flow of the lubricating oil is facilitated by a groove 63 extending in the radial direction, an oil reservoir of the lubricating oil increases, and drops of the lubricating oil are scattered to the clutch 30 side by the centrifugal force, whereby the lubricating oil can be fed to the clutch 30.

At this time, the lubricating oil flowing through the thrust section 61 can cause the lubricating oil received by the oil reception section 65 to flow also from the inner circumference surface side of the clutch hub 33 of the clutch 30, whereby the lubricating oil can be fed to the clutch 30 side with high efficiency with the influence of the centrifugal force.

The sixth embodiment shown in FIG. 11 and the fifth embodiment differ in the position of the groove 63 extending in the radial direction.

That is, the washer 60 of the lubricating oil supply device for an automatic transmission of the fifth embodiment is annular-shaped, and the groove 63 extending in the radial direction with the oil reception section 65 is formed in middle positions between the respective oil reception sections 65 in the circumference of the washer 60. In the case of carrying out the present invention, the groove 63 extending in the radial direction may be not only in the middle positions between the respective oil reception sections 65 in the circumference of the washer 60, but also closer to one side or provided in a plurality of numbers between the respective oil reception sections 65.

Thus, the end surface in the shaft direction, i.e., the thrust surface 64 can be cooled and lubricated by the lubricating oil up to the groove 63 extending in the radial direction, and the lubricating oil can also be supplied to other mechanism portions. However, in the case of supplying the lubricating oil to the clutch 30 side intensively, a structure of the sixth embodiment is preferable.

The groove 63 extending in the radial direction of the annular washer 60 is formed continuous with the guide path 66 formed from the oil reception section 65. The groove 63 formed to correspond with the oil reception section 65 and extending in the radial direction allows the washer 60 to supply even the lubricating oil which does not pass over a step 68 thereof directly to other mechanism portions such as the clutch 30. The lubricating oil passed over the step 68 can be guided to the thrust surface 64 which is the end surface in the shaft direction.

That is, the lubricating oil received by the oil reception section 65 can be directly supplied to other mechanism portions such as the clutch 30 by the centrifugal force from the groove 63 extending in the radial direction, and the lubricating oil can simultaneously be caused to flow on a thrust surface 64 side by the lubricating oil passed over the step 68.

Thus, in this case, it is preferable that a large amount of the lubricating oil be used in other mechanism portions such as the clutch 30 before the lubricating oil is used at the thrust surface 64.

The oil reception section 65 of the annular-shaped washer 60 can be engaged with the cutout formed in the end section 33a of the clutch hub 33 in the radial direction of the input shaft 1 to prevent a rotation of the annular-shaped washer 60.

In this manner, in the lubricating oil supply device for an automatic transmission of the fifth and sixth embodiments which has the approximately annular-shaped washer 60 arranged inside the automatic transmission and regulating the movement in the shaft length direction of the input shaft 1 in the automatic transmission, and supplies the lubricating oil to the approximately annular-shaped washer 60, the approximately annular-shaped washer 60 includes the oil reception section 65, which receives the lubricating oil scattered by the centrifugal force in the radial direction as an orthogonal direction of the shaft length direction of the input shaft 1 of the automatic transmission, and the guide path 66, which guides the lubricating oil received by the oil reception section 65 to the thrust surface 64 of a shaft direction end surface of the approximately annular-shaped washer 60.

Thus, since the lubricating oil received by the oil reception section 65 and passed through the guide path 66 can be used for cooling and lubricating the approximately annular-shaped washer 60 at a contact surface when the movement in the shaft direction of the input shaft 1 in the automatic transmission is regulated, and the oil reception section 65 can be arranged to overlap in the circumference on the carrier cover 41 side, it is not necessary to set a particular space as an oil reception section which receives the lubricating oil, whereby a width thereof in the shaft direction of the input shaft 1 can be made narrower compared with the case where the oil reception section is formed by the wall sections 41a on both sides of the carrier cover 41 extending in the radial direction of the pinion shaft 4 and the base section 41b extending in the shaft direction therebetween, and the whole automatic transmission can be made compact.

The oil reception section 65 supplies the lubricating oil from the inner circumference side in the shaft direction of the input shaft 1. The lubricating oil of the oil reception section 65 can be supplied to other mechanism sides such as the clutch 30 side, for example, and sufficient lubricating oil can be ensured for other mechanism portions such as the clutch 30 even in the case where the automatic transmission is structured to be compact, whereby the lubricating oil can be determined suitably.

The lubricating oil supply device for an automatic transmission of the fifth and sixth embodiments, which supplies the lubricating oil to the clutch 30 having the clutch plate 31 and the clutch disk 32 arranged inside the automatic transmission, has the carrier 3 and the approximately annular-shaped carrier cover 41 which attach both ends of the pinion shaft 4 of the planetary gear arranged in the shaft direction of the input shaft 1 of the automatic transmission, the oil reception section 65 which is formed in the carrier cover 41 in the radial direction of the input shaft 1 and receives the lubricating oil, and the guide path 66 which guides the lubricating oil received by the oil reception section 65 to the thrust surface 64 of the end surface in the shaft direction, includes the approximately annular-shaped washer 60 which regulates the movement in the shaft direction of the input shaft 1 in the automatic transmission, and directly supplies the lubricating oil, supplied from the lubricating oil hole 23 of the clutch drum 22 arranged in the circumference of the input shaft 1, from the drain groove 25b of the cancel plate 25 to the oil reception section 65 without an intervention along the path.

Thus, the movement in the shaft direction of the input shaft 1 in the automatic transmission is regulated, and at this time, the lubricating oil is received and used for cooling and lubricating the approximately annular-shaped washer 60 at the contact surface and the lubricating oil supplied from the lubricating oil hole 23 of the clutch drum 22 arranged in the circumference of the input shaft 1 is supplied from the drain groove 25b of the cancel plate 25 to the oil reception section 65 without an intervention along the path.

Therefore, since the lubricating oil received by the oil reception section 65 and passed through the guide path 66 can be used for cooling and lubricating the approximately annular-shaped washer 60 at the contact surface of the thrust surface 64 when the movement in the shaft direction of the input shaft 1 in the automatic transmission is regulated, and the oil reception section 65 can be arranged to overlap in the circumference on the carrier cover 41 side, it is not necessary to set a particular space as the oil reception section 65 which receives the lubricating oil, whereby the width thereof in the shaft direction of the input shaft 1 can be made narrower compared with the case where the oil reception section 65 is formed of the wall sections 41a on both sides of the carrier cover 41 extending in the radial direction of the pinion shaft 4 and the base section 41b extending in the shaft direction therebetween, and the whole automatic transmission can be made compact.

The oil reception section 65 supplies the lubricating oil from the radial direction inner circumference side of the carrier cover 41, whereby the lubricating oil of the oil reception section 65 can be supplied to other mechanism sides such as the clutch 30, and sufficient lubricating oil for the clutch 30 can be ensured even in the case where the automatic transmission is structured to be compact. When the guide path 66 which supplies the lubricating oil to a clutch 30 direction is provided to the inner circumference surface of the clutch hub 33, the lubricating oil flows to the side of the pinion shaft 4 of the planetary gear and to the clutch 30 side from the guide path 66, whereby the lubricating oil can be supplied to other mechanisms such as the clutch 30. A supply characteristic of the lubricating oil can be set by a shape of the guide path 66.

Further, since the lubricating oil supplied from the lubricating oil hole 23 of the clutch drum 22 arranged in the circumference of the input shaft 1 is supplied from the drain groove 25b of the cancel plate 25 to the oil reception section 65 without an intervention along the path, the absence of the intervention along the path indicates that a part which causes a clog or the like is not present, whereby a stable supply of the lubricating oil is possible and a leak of the lubricating oil due to the intervention does not occur.

Since the approximately annular-shaped washer 60 is formed with a plurality of the grooves 63 extending in the radial direction, the lubricating oil is caused to flow from the plurality of grooves 63 extending in the radial direction to the clutch 30 side by the guide path 66, which is on the inner circumference surface of the clutch hub 33 and supplies the lubricating oil in the clutch 30 direction, whereby the lubricating oil on the clutch 30 side can suitably be determined. The supply characteristic of the lubricating oil can be set by the shape of the oil reception section 65 and the guide path 66.

Further, since the guide path 66 for guidance to the thrust surface 64 as the end surface of the approximately annular-shaped washer 60 in the shaft direction is provided with the step 68 extending in the radial direction, and only the lubricating oil overflowed from the step 68 is guided to the thrust surface 64 of the approximately annular-shaped washer 60, the lubricating oil flows from the plurality of grooves 63 extending in the radial direction to the clutch 30 side, whereby the lubricating oil on the clutch side can suitably be determined. The supply characteristic of the lubricating oil can be set by the shape of the oil reception section 65 and the guide path 66.

Moreover, since the oil reception section 65 of the approximately annular-shaped washer 60 engages with the clutch hub 33 of the clutch 30 on an opposite side of the oil reception section 65, an assembly can simplified.

Since the groove 63 extending in the radial direction with the oil reception section 65 of the approximately annular-shaped washer 60 is formed in a position on the opposite side of the oil reception section 65 in the circumference of the approximately annular-shaped washer 60, an attachment stability of the approximately annular-shaped washer 60 and the flow of the lubricating oil are improved in the washer 60, and the groove 63 formed in the position on the opposite side of the oil reception section 65 can directly supply the lubricating oil to other mechanism portions and guide the lubricating oil to the shaft direction end surface of the approximately annular-shaped washer 60. That is, the groove 63 extending in the radial direction allows the supply of the lubricating oil to other mechanism portions to be prioritized and then the lubricating oil to be supplied to the thrust surface 64 of the approximately annular-shaped washer 60.

Since the groove 63 extending in the radial direction with the oil reception section 65 of the approximately annular-shaped washer 60 is formed in a position between the respective oil reception sections 65 in the circumference of the approximately annular-shaped washer 60, the attachment stability of the approximately annular-shaped washer 60 and the flow of the lubricating oil are improved in the washer 60, and the groove 63 formed in the position between the respective oil reception sections 65 on the opposite side can directly guide the lubricating oil to the thrust surface 64 of the end surface of the shaft direction and supply the lubricating oil also to other mechanism portions. That is, the supply of the lubricating oil to the thrust surface 64 of the approximately annular-shaped washer 60 can be prioritized.

Note that, in the case of carrying out the present invention, the first embodiment to the sixth embodiment can be carried out with an overlapping portion being omitted, as shown in the sectional view of FIG. 9 of the embodiments described above.

According to an exemplary aspect of the invention, the washer is annular-shaped or approximately annular-shaped, arranged inside the automatic transmission, and regulates the movement of a specific mechanism in the shaft length direction of the input shaft in the automatic transmission, and the lubricating oil is supplied to the thrust surface on a contact side thereof.

According to an exemplary aspect of the invention, the oil reception section receives the lubricating oil scattered by a centrifugal force in the radial direction of the input shaft of the automatic transmission, and the oil reception section excluding a guide path side forms a storage portion which receives the lubricating oil scattered by the centrifugal force. The guide path guides the lubricating oil received by the oil reception section to the thrust surface at the end surface of the washer in the shaft direction.

According to an exemplary aspect of the invention, the clutch to be fed with the oil is formed of one or more clutch plates and clutch disks arranged inside the automatic transmission. In the case of an automatic transmission with a plurality of speeds, a pinion shaft of any planetary gear may be applied as the pinion shaft. It suffices that a sectional shape of a wall section of the carrier cover extending in a radial direction of the pinion shaft and a base section extending in the shaft direction of the pinion shaft on an inner circumference side of the carrier cover be an approximate L-shape or an approximate half U-shape (approximate J-shape).

According to an exemplary aspect of the invention, the washer has the oil reception section, which is formed in the radial direction of the input shaft for the carrier cover and receives the lubricating oil, and the guide path, which guides the lubricating oil received by the oil reception section to the thrust surface at the end surface in the shaft direction, and regulates the movement in the shaft length direction of the input shaft in the automatic transmission.

According to an exemplary aspect of the invention, the oil reception section receive the lubricating oil scattered by the centrifugal force in the radial direction of the input shaft of the automatic transmission, and that the oil reception section excluding the guide path side form a storage section which receives the lubricating oil scattered by the centrifugal force. It suffices that the guide path guide the lubricating oil received by the oil reception section to the thrust surface of the washer in the shaft direction.

In addition, the lubricating oil supplied from the lubricating oil hole of the clutch drum arranged in the circumference of the input shaft is supplied from the lubricating oil groove of the cancel plate to the oil reception section without an intervention along the path, and an absence of the intervention along the path means that a part which causes a clog or the like does not exist.

According to an exemplary aspect of the invention, the groove extending in the radial direction of the washer feeds the lubricating oil to a mechanism portion such as the clutch in an outer circumference section position without blocking a flow of the lubricating oil with the washer.

According to an exemplary aspect of the invention, the guide path for guidance to the end surface of the washer in the shaft direction included in a lubricating oil supply device is provided with a step on the surface extending in the radial direction, whereby only the lubricating oil overflowed from the step is guided to the thrust surface of a shaft direction end surface of the washer.

According to an exemplary aspect of the invention, only the lubricating oil overflowed from the step on the surface extending in the radial direction is guided to the thrust surface of the shaft direction end surface of the washer, which indicates that the lubricating oil, excluding a part of the lubricating oil, is not guided to the thrust surface of the washer in the shaft direction until the lubricating oil overflows from the step, whereby the lubricating oil is supplied to other mechanism portions at this time.

According to an exemplary aspect of the invention, for an engagement with the clutch hub on the opposite side of the oil reception section of the washer, it suffices that the oil reception section be engaged with a cutout or an outer circumference of the clutch hub on the opposite side of the oil reception section so as not to be unattached easily.

According to an exemplary aspect of the invention, the clutch to be fed with the oil is formed of one or more clutch plates and clutch disks arranged inside the automatic transmission. In the case of an automatic transmission with a plurality of speeds, a pinion shaft of any planetary gear may be applied as the pinion shaft. It suffices that the sectional shape of the wall section of the carrier cover extending in the radial direction of the pinion shaft and the base section extending in the shaft direction of the pinion shaft on the inner circumference side of the carrier cover be an approximate L-shape or an approximate half U-shape (approximate J-shape). The end section as a part on the inner circumference surface of the clutch hub connected with the base section extending in the shaft direction of the pinion shaft means a part of the clutch hub on an inner circumference surface side. It suffices that the predetermined cutout be provided on the inner circumference surface side of the clutch hub to supply the lubricating oil in a concentrated manner therefrom. In particular, since a supply amount of the lubricating oil supplied from the cutout is stable, in a structure in which the predetermined cutout is provided and the lubricating oil is supplied therefrom, the lubricating oil is more easily influenced by the centrifugal force, whereby the lubricating oil is supplied stably.

Further, the oil reception section in the circumferential direction which is open in the shaft length direction of the input shaft is the oil reception section which is formed by the wall section of the carrier cover, the base section of the carrier cover extending in the shaft direction of the pinion shaft, and the inner circumference surface as a part of the clutch hub connected with the base section and is specified as a groove in the circumferential direction, which is open in the shaft length direction of the input shaft. The depth of the oil reception section is determined by the wall section of the carrier cover and the end section as a part on the inner circumference surface of the clutch hub, and the width thereof is determined by the base section extending in the shaft direction of the pinion shaft. Since the cutout which supplies the lubricating oil in the clutch direction is provided to the inner circumference surface of the clutch hub, an amount of the lubricating oil to be supplied is determined by a shape of the cutout, and the lubricating oil is more likely influenced by the centrifugal force thereof, whereby a supply characteristic of the lubricating oil can be made to differ depending on the shape of the cutout.

According to an exemplary aspect of the invention, the clutch to be fed with the oil be formed of one or more clutch plates and clutch disks is arranged inside the automatic transmission. In the case of an automatic transmission with a plurality of speeds, a pinion shaft of any planetary gear may be applied as the pinion shaft. It suffices that the sectional shape of the wall section of the carrier cover extending in the radial direction of the pinion shaft and the base section extending in the shaft direction of the pinion shaft on the inner circumference side of the carrier cover be an approximate L-shape or an approximate half U-shape (approximate J-shape). The end section as a part on the inner circumference surface of the clutch hub connected with the base section extending in the shaft direction of the pinion shaft means a part of the clutch hub on the inner circumference surface side. It suffices that the predetermined cutout be provided on the inner circumference surface side of the clutch hub to supply the lubricating oil in a concentrated manner therefrom. In particular, since the supply amount of the lubricating oil supplied from the cutout is stable, in the structure in which the predetermined cutout is provided and the lubricating oil is supplied therefrom, the lubricating oil is more easily influenced by the centrifugal force, whereby the lubricating oil is supplied stably.

The lubricating oil supplied from the lubricating oil hole of a drum member arranged in the circumference of the input shaft is supplied from the lubricating oil groove of the cancel plate to the oil reception-section without an intervention along the path, and the absence of the intervention along the path means that a part which causes a clog or the like does not exist.

According to an exemplary aspect of the invention, the cutout formed on the inner circumference side of the clutch hub included in a lubricating oil supply device has a shape which is made smaller as a radial distance from the center of the input shaft increases.

According to an exemplary aspect of the invention, the shape in which the width in the circumferential direction thereof becomes narrower as a radial distance from the center of the input shaft increases allows a balance point to be generated by largely varying the amount of the lubricating oil supplied from the cutout, whereby the depth of the lubricating oil in the oil reception section can be made constant. Specifically, the shape may be, for example, a triangle, a trapezoid, a semicircle, and the like with a larger length on a side of the input shaft as the center. At this time, since the lubricating oil is ordinarily supplied also to a pinion shaft side, a balance thereof can be set to a specific value.

According to an exemplary aspect of the invention, between the clutch hub and a cancel plate which controls the clutch included in a lubricating oil supply device, a washer which regulates the movement of the clutch hub in the shaft direction and is formed with a groove extending in the radial direction is arranged in a position with a larger outer radial distance than a position of the cutout from the center of the input shaft.

According to an exemplary aspect of the invention, the washer is formed with the groove extending in the radial direction of a center shaft so that the flow of the lubricating oil is smoothed even when there is the movement of the clutch hub in the shaft direction. Although the washer regulates the movement of the clutch hub in the shaft direction, the washer is formed of a synthetic resin since a large external force is not applied. Use of something other than the synthetic resin is not excluded.

According to an exemplary aspect of the invention, the groove, provided to the washer to extend in the radial direction of the input shaft, included in a lubricating oil supply device is arranged to be dislocated in phase with the cutout of the clutch hub in a circular circumference direction.

According to an exemplary aspect of the invention, since the groove provided to the washer to extend in the radial direction and the cutout of the clutch hub are dislocated in phase in the circular circumferential direction and the lubricating oil applied with the centrifugal force is not directly obstructed by the washer, the washer and the cancel plate can be lubricated therebetween, and the lubricating oil can be supplied to a clutch hub side even if the lubricating oil is caused to flow in a rotational direction by a rotation since the phases are dislocated.

According to an exemplary aspect of the invention, a support wall section of the cancel plate which controls the clutch included in a lubricating oil supply device is arranged with the washer on one side and arranged with a return spring on another side of the support wall section.

According to an exemplary aspect of the invention, the grooved washer in a narrow space between the cancel plate and the carrier ensure the supply of the lubricating oil to the clutch at the groove extending in the radial direction.

According to an exemplary aspect of the invention, the lubricating oil supplied to the oil reception section included in a lubricating oil supply device is supplied to a pinion shaft-supported by the pinion shaft included in the automatic transmission and to a needle bearing between the pinion shaft and the pinion via a lubricating oil hole of the pinion shaft, and is supplied to the clutch via the cutout formed at the end section on the inner circumference surface of the clutch hub.

According to an exemplary aspect of the invention, the shapes of the lubricating oil hole of the pinion shaft, a lubricating oil hole of the needle bearing between the pinion shaft and the pinion, and the cutout determine an amount of the lubricating oil for the pinion shaft, the lubricating oil for the needle bearing, and the lubricating oil supplied to a clutch side.

According to an exemplary aspect of the invention, the oil reception section is formed by the wall section of the carrier cover, the base section of the carrier cover extending in the shaft direction of the pinion shaft, and the end section on the inner circumference surface of the clutch hub connected with the base section, such that the end section on the inner circumference surface of the clutch hub is lower than the wall section of the carrier cover. That is, the diameter of the end section on the inner circumference surface of the clutch hub connected with the base section of the carrier cover is smaller than the diameter of the wall section formed in the radial direction of the input shaft.

According to an exemplary aspect of the invention, the washer annular-shaped, and the oil reception section thereof and the groove extending in the radial direction are formed in a position on an opposite side of the oil reception section.

The washer may be in an approximate annular shape such as a C-shape instead of an annular shape, but the annular shape in particular improves stability of attachment of the washer and the flow of the lubricating oil. The groove formed in the position on the opposite side of the oil reception section directly guides the lubricating oil to the end surface in the shaft direction and supplies the lubricating oil also to other mechanism portions.

According to an exemplary aspect of the invention, the washer is annular-shaped, and the oil reception section thereof and the groove extending in the radial direction are formed in a position between the respective oil reception sections in a circumference of the annular-shaped washer. The lubricating oil allows the end surface in the shaft direction to be cooled and lubricated particularly up to the groove extending in the radial direction, and the lubricating oil is supplied also to other mechanism portions.

According to an exemplary aspect of the invention, the washer includes the oil reception section which receives the lubricating oil scattered by the centrifugal force in the radial direction of the input shaft of the automatic transmission and the guide path which guides the lubricating oil received by the oil reception section to the thrust surface at the end surface of the washer in the shaft direction. Thus, since the lubricating oil received by the oil reception section and passed through the guide path can be used for cooling and lubricating the washer at the thrust surface as a contact surface when the movement in the shaft length direction of the input shaft in the automatic transmission is regulated, setting a particular space as the oil reception section which receives the lubricating oil is not necessary, whereby the width thereof in the shaft length direction of the input shaft can be made narrow and the whole automatic transmission can be made compact compared to the case where the oil reception section is formed of the wall sections on both sides of the carrier cover extending in the radial direction of the pinion shaft and the base section extending in the shaft direction therebetween.

The oil reception section supplies the lubricating oil from the inner circumference side in the shaft length direction of the input shaft, and the lubricating oil of the oil reception section can not only be used for cooling and lubricating the washer but also be supplied to mechanism sides such as the clutch, for example, whereby sufficient lubricating oil can be ensured for another mechanism portion such as the clutch and the lubricating oil can be supplied suitably even in the case where the automatic transmission is structured to be compact.

According to an exemplary aspect of the invention, the washer has the oil reception section, which receives the lubricating oil and is formed of the carrier and the approximately annular-shaped carrier cover, which attach both ends of the pinion shaft of the planetary gear arranged in the shaft length direction of the input shaft of the automatic transmission, in the radial direction of the input shaft, and the guide path, which guides the lubricating oil received by the oil reception section to the thrust surface at the end surface in the shaft direction, whereby the movement in the shaft length direction of the input shaft in the automatic transmission is regulated while the lubricating oil is used for cooling and lubricating the washer at the thrust surface as the contact surface, and the lubricating oil, supplied from the lubricating, oil hole of the clutch drum arranged in the circumference of the input shaft, is supplied from the lubricating oil groove of the cancel plate to the oil reception section without an intervention along the path.

Thus, since the lubricating oil received by the oil reception section and passed through the guide path can be used for cooling and lubricating the washer at the contact surface when the movement in the shaft length direction of the input shaft in the automatic transmission is regulated, setting of the particular space as the oil reception section which receives the lubricating oil is not necessary, whereby the width thereof in the shaft length direction of the input shaft can be made narrow and the whole automatic transmission can be made compact compared to the case where the oil reception section is formed of the wall sections on both sides of the carrier cover extending in the radial direction of the pinion shaft and the base section extending in the shaft direction therebetween.

The oil reception section supplies the lubricating oil from a radial direction inner circumference side of the carrier cover, whereby the lubricating oil of the oil reception section can be supplied to the side of another mechanism such as the clutch, and sufficient lubricating oil for another mechanism such as the clutch can be ensured even in the case where the automatic transmission is structured to be compact. With the guide path which supplies the lubricating oil in the clutch direction provided to the inner circumference surface of the clutch hub, the lubricating oil flows from the guide path to the clutch side, whereby the lubricating oil can be suitably supplied to the clutch side. The supply characteristic of the lubricating oil can be set by the shape of the guide path.

Further, since the lubricating oil supplied from the lubricating oil hole of the clutch drum arranged in the circumference of the input shaft is supplied from the lubricating oil groove of the cancel plate to the oil reception section without an intervention along the path, the absence of the intervention along the path indicates that a part which causes a clog or the like does not exist, whereby a stable supply of the lubricating oil is possible and a leak of the lubricating oil due to the intervention does not occur.

According to an exemplary aspect of the invention, the washer is formed with a plurality of grooves extending in the radial direction, and the guide path which supplies the lubricating oil in the clutch direction is provided to the inner circumference surface of the clutch hub, whereby the lubricating oil flows from the plurality of grooves extending in the radial direction to the clutch side and the lubricating oil can be supplied to the clutch side in an appropriate amount. The supply characteristic of the lubricating oil can be set by the shape of the oil reception section and the guide path.

The guide path, for guidance to the end surface of the washer in the shaft direction, of the lubricating oil supply device is provided with the step on the surface extending in the radial direction, and only the lubricating oil overflowed from the step is guided to the end surface of the washer in the shaft direction, whereby the lubricating oil flows from the plurality of grooves extending in the radial direction to the clutch side and the lubricating oil can be supplied to the clutch side in an appropriate amount. The supply characteristic of the lubricating oil can be set by the shape of the oil reception section and the guide path.

According to an exemplary aspect of the invention, the oil reception section of the washer is engaged with the clutch hub included in the clutch on the opposite side of the oil reception section, whereby an assembly can be simplified.

According to an exemplary aspect of the invention, the oil reception section in the circumferential direction, which receives the lubricating oil and is open in the shaft length direction of the input shaft, is formed in the carrier cover by the wall section of the carrier cover extending in the radial direction of the pinion shaft, the base section extending in the shaft direction of the pinion shaft, and the end section as a part on the inner circumference surface of the clutch hub connected with the base section of the pinion shaft, whereby the width thereof in the shaft length direction of the input shaft can be made narrow and the whole automatic transmission can be made compact compared to that in which the oil reception section is formed by the wall sections on both sides of the carrier cover extending in the radial direction of the pinion shaft and the base section extending in the shaft direction therebetween. The oil reception section supplies the lubricating oil from the radial direction inner circumference side of the carrier cover, whereby the lubricating oil of the oil reception section can be distributed to the pinion shaft side and the clutch side, and sufficient lubricating oil for the clutch can be ensured even in the case where the automatic transmission is structured to be compact. Since the cutout which supplies the lubricating oil in the clutch direction is provided to the inner circumference surface of the clutch hub, the lubricating oil flows to a side of the pinion shaft of the planetary gear and to the clutch side from the cutout, whereby the lubricating oil can be distributed suitably to a planetary gear side and the clutch side. The supply characteristic of the lubricating oil can be set by a shape of the cutout.

According to an exemplary aspect of the invention, the oil reception section in the circumferential direction, which receives the lubricating oil and is open in the shaft length direction of the input shaft, is formed in the carrier cover by the wall section of the carrier cover extending in the radial direction of the pinion shaft, the base section extending in the shaft direction of the pinion shaft, and the end section as a part on the inner circumference surface of the clutch hub connected with the base section of the pinion shaft, whereby the width thereof in the shaft length direction of the input shaft can be made narrow and the whole automatic transmission can be made compact compared to that in which the oil reception section is formed by the wall sections on both sides of the carrier cover extending in the radial direction of the pinion shaft and the base section extending in the shaft direction therebetween.

The oil reception section supplies the lubricating oil from the radial direction inner circumference side of the carrier cover, whereby the lubricating oil of the oil reception section can be distributed to the pinion shaft side and the clutch side, and sufficient lubricating oil for the clutch can be ensured even in the case where the automatic transmission is structured to be compact. Since the cutout which supplies the lubricating oil in the clutch direction is provided to the inner circumference surface of the clutch hub, the lubricating oil flows to the side of the pinion shaft of the planetary gear and to the clutch side from the cutout, whereby the lubricating oil can be distributed suitably to the planetary gear side and the clutch side. The supply characteristic of the lubricating oil can be set by the shape of the cutout.

Further, since the lubricating oil supplied from the lubricating oil hole of the clutch drum arranged in the circumference of the input shaft is supplied from the lubricating oil groove of the cancel plate to the oil reception section without an intervention along the path, the absence of the intervention along the path indicates that a part which causes a clog or the like does not exist, whereby the stable supply of the lubricating oil is possible and the leak of the lubricating oil due to the intervention does not occur.

According to an exemplary aspect of the invention, since the cutout formed on the inner circumference side of the clutch hub of the lubricating oil supply device is formed to have the shape which is made smaller as the radial distance from the center of the input shaft increases, the lubricating oil is caused to flow from the cutout to the clutch side while ensuring the lubricating oil on the pinion shaft side, whereby an oil surface of the oil reception section is stabilized (balanced) and the lubricating oil can be supplied stably to the pinion shaft side and the clutch side.

According to an exemplary aspect of the invention, between the clutch hub and the cancel plate, the washer, which regulates the movement of the clutch hub in the shaft direction and is formed with the groove extending in the radial direction, is arranged in the position with a larger outer radial distance than the position of the cutout in the radial direction from the center of the input shaft. Thus, since the washer which regulates the position of the clutch hub in the shaft direction is arranged between the clutch hub and the cancel plate, the washer being arranged on a radial direction outer side than the cutout and further being formed with the groove extending in the radial direction, the lubricating oil supplied from the cutout flows to a washer side by a rotation of the clutch hub, and is further supplied to the plurality of clutch plates and the clutch disks of the clutch via the groove of the washer extending in the radial direction, whereby the lubricating oil can be supplied sufficiently even if the automatic transmission is structured to be compact.

According to an exemplary aspect of the invention, the groove, provided to the washer to extend in the radial direction, is disposed to be dislocated in phase in the circular circumferential direction with the cutout of the clutch hub. Thus, although the lubricating oil supplied from the cutout flows in the rotational direction due to the rotation of the clutch hub and the washer, the groove of the washer extending in the radial direction being dislocated in phase with the cutout allows a lubrication between the washer and the cancel plate, and the lubricating oil can be supplied to the clutch hub side without being obstructed by the washer even if the lubricating oil is supposedly applied with the centrifugal force of the rotation since the phases are dislocated.

According to an exemplary aspect of the invention, since the lubricating oil supply device is arranged with the washer on one side and arranged with the return spring on another side of the support wall section with the support wall section of the cancel plate which controls the clutch therebetween, the grooved washer is arranged in the narrow space between the cancel plate and the carrier, whereby ensuring the space allows the supply of the lubricating oil to the clutch to be ensured and the automatic transmission as a whole to be structured to be compact.

According to an exemplary aspect of the invention, the lubricating oil supplied to the oil reception section is supplied to the pinion shaft-supported by the pinion shaft included in the automatic transmission and to the needle bearing therebetween via the lubricating oil hole of the pinion shaft, and is supplied to the clutch via the cutout formed in the end section on the inner circumference surface of the clutch hub, whereby a distribution amount of the lubricating oil of the pinion shaft-supported by the pinion shaft, the lubricating oil of the needle bearing therebetween, and the lubricating oil supplied from the end section on the inner circumference surface of the clutch hub to the clutch side can suitably be determined.

According to an exemplary aspect of the invention, the oil reception section of the lubricating oil supply device is formed by the wall section of the carrier cover, the base section of the carrier cover extending in the shaft direction of the pinion shaft, and the end section on the inner circumference surface of the clutch hub connected with the base section, such that the end section on the inner circumference surface of the clutch hub is lower than the wall section of the carrier cover, whereby the lubricating oil of the oil reception section inevitably flows to the clutch hub side and the lubricating oil can be supplied stably to the clutch.

According to an exemplary aspect of the invention, the washer is annular-shaped, and the oil reception section thereof and the groove extending in the radial direction are formed in the position on the opposite side of the oil reception section, whereby the stability of attachment of the annular-shaped washer and the flow of the lubricating oil are improved in the washer, and the groove formed in the position on the opposite side of the oil reception section can directly supply the lubricating oil to another mechanism portion and guide the lubricating oil to the shaft direction end surface of the annular-shaped washer. That is, the groove extending in the radial direction allows the supply of the lubricating oil to another mechanism portion to be prioritized and then the lubricating oil to be supplied to the shaft direction end surface of the annular-shaped washer.

According to an exemplary aspect of the invention, the washer of the lubricating oil supply device is annular-shaped, and the oil reception section thereof and the groove extending in the radial direction are formed in the position between the respective oil reception sections in the circumference of the annular-shaped washer, whereby the stability of attachment of the annular-shaped washer and the flow of the lubricating oil are improved in the washer, and the groove formed in the position between the respective oil reception sections on the opposite side can directly guide the lubricating oil in the shaft direction and supply the lubricating oil also to another mechanism portion. That is, the supply of the lubricating oil to the shaft direction end surface of the annular-shaped washer can be prioritized.

The invention claimed is:

1. A lubricating oil supply device for an automatic transmission, comprising:
   a washer arranged inside the automatic transmission and regulating a movement of an input shaft in the automatic transmission in a shaft direction, wherein the washer includes:
      an oil reception section that receives lubricating oil scattered by a centrifugal force in a radial direction of the input shaft of the automatic transmission, and
      a guide path that guides the lubricating oil received by the oil reception section to a thrust surface at an end surface of the washer in the shaft direction,
   wherein a step is provided on a surface extending in the radial direction on the guide path for guidance to the thrust surface of the washer in the shaft direction, and only the lubricating oil overflowed from the step is guided to the thrust surface of the washer in the shaft direction.

2. The lubricating oil supply device for the automatic transmission according to claim 1, wherein the washer is formed with a groove extending in the radial direction.

3. The lubricating oil supply device for the automatic transmission according to claim 1, wherein the oil reception section of the washer is engaged with a clutch hub of a clutch on an opposite side of the oil reception section.

4. The lubricating oil supply device for the automatic transmission according to claim 1, wherein the washer is annular-shaped, and the oil reception section and a groove extending in the radial direction are formed at a thrust surface side at a circumference of the washer.

5. The lubricating oil supply device for the automatic transmission according to claim 1, wherein the washer is annular-shaped and includes a plurality of oil reception sections, and a groove extending in the radial direction is formed at a thrust surface side between adjacent oil reception sections at a circumference of the washer.

6. The lubricating oil supply device for the automatic transmission according to claim 1, wherein the lubricating oil, supplied from a lubricating oil hole of a clutch drum arranged in a circumference of the input shaft, is directly supplied from a lubricating oil groove of a cancel plate to the oil reception section without an intervention along a path.

7. A lubricating oil supply device for an automatic transmission that supplies lubricating oil to a clutch having a clutch plate and a clutch disk arranged inside the automatic transmission, the lubricating oil supply device comprising:
a washer that has:
an oil reception section that is formed, with respect to an approximately annular-shaped carrier cover that attaches both ends of a pinion shaft of a planetary gear arranged in a shaft direction of an input shaft of the automatic transmission, in a radial direction of the input shaft and receives the lubricating oil, and
a guide path that guides the lubricating oil received by the oil reception section to a thrust surface at an end surface of the washer in the shaft direction, wherein:
the washer regulates a movement in the shaft direction of the input shaft in the automatic transmission; and
the lubricating oil, supplied from a lubricating oil hole of a clutch drum arranged at a circumference of the input shaft, is directly supplied from a lubricating oil groove of a cancel plate to the oil reception section without an intervention along a path.

8. A lubricating oil supply device for an automatic transmission that supplies lubricating oil to a clutch having a clutch plate and a clutch disk arranged inside the automatic transmission, the lubricating oil supply device comprising:
a carrier and a carrier cover that attach both ends of a pinion shaft of a planetary gear arranged in a shaft direction of an input shaft of the automatic transmission;
an oil reception section structured by a wall section formed in the carrier cover in a radial direction of the input shaft, a base section of the carrier cover extending in a shaft direction of the pinion shaft, and an end section of an inner circumference surface of a clutch hub connected with the base section, the oil reception section being open in the shaft direction of the input shaft and in a circumferential direction; and
a cutout which is formed on the inner circumference surface of the clutch hub and supplies the lubricating oil of the oil reception section in a clutch direction.

9. The lubricating oil supply device for the automatic transmission according to claim 8, wherein the lubricating oil, supplied from a lubricating oil hole of a clutch drum arranged at a circumference of the input shaft, is supplied from a drain groove of a cancel plate to the oil reception section without an intervention along a path.

10. The lubricating oil supply device for the automatic transmission according to claim 8, wherein the cutout formed on the inner circumference surface of the clutch hub has a width in a circumferential direction that becomes narrower as a radial distance from the center of the input shaft increases.

11. The lubricating oil supply device for the automatic transmission according to claim 8, further comprising:
a washer arranged between the clutch hub and a cancel plate that controls the clutch, the washer regulating a movement of the clutch hub in the shaft direction and is formed with a groove extending in the radial direction, in a position with a larger outer radial distance than a position of the cutout from a center of the input shaft.

12. The lubricating oil supply device for the automatic transmission according to claim 11, wherein the groove provided to the washer and extending in the radial direction of the input shaft is arranged to be dislocated in phase with the cutout of the clutch hub in a circular circumferential direction.

13. The lubricating oil supply device for the automatic transmission according to claim 11, wherein the washer is annular-shaped and includes an oil reception section, and the oil reception section of the washer and the groove extending in the radial direction are formed at a thrust surface side at a circumference of the washer.

14. The lubricating oil supply device for the automatic transmission according to claim 11, wherein the washer is annular-shaped and includes a plurality of oil reception sections, and the oil reception sections of the washer and the groove extending in the radial direction are formed at a thrust surface side between adjacent oil reception sections at a circumference of the annular-shaped washer.

15. The lubricating oil supply device for the automatic transmission according to claim 8, wherein the cancel plate of the clutch is arranged with a washer on one side and a return spring on another side of a wall support section of the cancel plate.

16. The lubricating oil supply device for the automatic transmission according to claim 8, wherein the lubricating oil supplied to the oil reception section is supplied to a pinion shaft included in the automatic transmission and to a needle bearing between the pinion shaft and a pinion via a lubricating oil hole of the pinion shaft, and is supplied to the clutch via the cutout formed at the end section on the inner circumference surface of the clutch hub.

17. The lubricating oil supply device for the automatic transmission according to claim 8, wherein the oil reception section is such that the end section on the inner circumference surface of the clutch hub is lower than the wall section of the carrier cover.

18. The lubricating oil supply device for the automatic transmission according to claim 8, wherein a height of the end portion of the clutch hub, when using a distance of the base section of the carrier cover as a reference, is set lower than a height of the wall section of the carrier cover.

19. The lubricating oil supply device for the automatic transmission according to claim 18, wherein the lubricating oil that exceeds the end portion of the clutch hub is fed to a clutch.

* * * * *